(12) United States Patent
Cheng

(10) Patent No.: US 12,328,626 B2
(45) Date of Patent: Jun. 10, 2025

(54) DEVICE AND METHOD FOR HANDLING A RECOVERY OF A RADIO RESOURCE CONTROL CONNECTION OF A NON-TERRESTRIAL NETWORK

(71) Applicant: ACER INCORPORATED, New Taipei (TW)

(72) Inventor: Ching-Wen Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 373 days.

(21) Appl. No.: 17/979,781

(22) Filed: Nov. 3, 2022

(65) Prior Publication Data

US 2023/0156534 A1 May 18, 2023

Related U.S. Application Data

(60) Provisional application No. 63/278,516, filed on Nov. 12, 2021.

(51) Int. Cl.
*H04W 36/00* (2009.01)
*H04B 7/185* (2006.01)
(Continued)

(52) U.S. Cl.
CPC ... *H04W 36/0055* (2013.01); *H04W 36/0079* (2018.08); *H04W 76/19* (2018.02)

(58) Field of Classification Search
CPC ......... H04W 36/0055; H04W 36/0079; H04W 76/19; H04W 36/083; H04W 76/27;
(Continued)

(56) References Cited

U.S. PATENT DOCUMENTS

2020/0314931 A1* 10/2020 Yamamoto ........ H04W 36/0069
2021/0051556 A1 2/2021 Lin
(Continued)

FOREIGN PATENT DOCUMENTS

CN 112399509 A 2/2021
EP 3 787 348 A1 3/2021
(Continued)

*Primary Examiner* — Harry H Kim
(74) *Attorney, Agent, or Firm* — Winston Hsu

(57) ABSTRACT

A communication device for handling a recovery of a radio resource control (RRC) connection of a non-terrestrial network (NTN) includes at least one storage device; and at least one processing circuit, coupled to the at least one storage device, wherein the at least one storage device stores instructions, and the at least one processing circuit is configured to execute the instructions of: establishing an RRC connection with a first cell of the NTN; receiving a collaborator cell configuration message from the first cell, wherein the collaborator cell configuration message comprises at least one collaborator cell configuration associated with at least one cell of the NTN; initiating a RRC connection recovery procedure, after receiving the collaborator cell configuration message; selecting a second cell for the RRC connection recovery procedure, when initiating the RRC connection recovery procedure; and performing the RRC connection recovery procedure with the second cell.

21 Claims, 18 Drawing Sheets

(51) Int. Cl.
  *H04W 24/08* (2009.01)
  *H04W 36/08* (2009.01)
  *H04W 76/19* (2018.01)
  *H04W 76/27* (2018.01)
  *H04W 84/06* (2009.01)

(58) Field of Classification Search
  CPC .. H04W 24/08; H04W 84/06; H04B 7/18508; H04B 7/18541
  See application file for complete search history.

(56) References Cited

U.S. PATENT DOCUMENTS

| | | | |
|---|---|---|---|
| 2021/0136641 A1 | 5/2021 | Roy | |
| 2021/0227481 A1 | 7/2021 | Xu | |
| 2021/0314828 A1 | 10/2021 | Kim | |
| 2021/0329518 A1* | 10/2021 | Sharma | H04W 36/322 |
| 2021/0337616 A1 | 10/2021 | Zhang | |
| 2022/0086715 A1 | 3/2022 | Hong | |
| 2022/0159732 A1* | 5/2022 | You | H04W 74/0833 |
| 2024/0147537 A1* | 5/2024 | Hwang | H04W 36/083 |
| 2024/0314650 A1* | 9/2024 | Grau | H04W 84/06 |

FOREIGN PATENT DOCUMENTS

| | | |
|---|---|---|
| WO | 2020/112011 A1 | 6/2020 |
| WO | 2020/192752 A1 | 10/2020 |
| WO | 2021/219322 A1 | 11/2021 |

* cited by examiner

DEVICE AND METHOD FOR HANDLING A RECOVERY OF A RADIO RESOURCE CONTROL CONNECTION OF A NON-TERRESTRIAL NETWORK

CROSS REFERENCE TO RELATED APPLICATIONS

This application claims the benefit of U.S. Provisional Application No. 63/278,516, filed on Nov. 12, 2021. The content of the application is incorporated herein by reference.

BACKGROUND OF THE INVENTION

1. Field of the Invention

The present invention relates to a device and a method used in a wireless communication system, and more particularly, to a device and a method of handling a recovery of a radio resource control connection of a non-terrestrial network.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

An LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (COMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

New advances in a NG (e.g., fifth generation (5G) new radio (NR)) standard create opportunities to integrate a non-terrestrial network (NTN) into an interoperable and standardized wireless experience across the globe. The NIN is able to satisfy requests of anywhere and anytime connection by offering wide-area coverage and ensuring service availability, continuity and scalability. However, the distance between gNBs or cells of gNBs in the NIN is far. It is difficult for the communication device to switch from a source gNB/cell to a target gNB/cell (e.g., from a cell of the gNB to another cell of the gNB, or from a cell of the gNB to another cell of another gNB), when a radio resource control (RRC) connection failure occurs. Thus, how to improve the performance of recovering the RRC connection of the NIN is an important problem to be solved.

SUMMARY OF THE INVENTION

The present invention therefore provides a communication device and method for handling a handover to solve the abovementioned problem.

A communication device for handling a recovery of a radio resource control (RRC) connection of a non-terrestrial network (NTN) includes at least one storage device; and at least one processing circuit, coupled to the at least one storage device, wherein the at least one storage device stores instructions, and the at least one processing circuit is configured to execute the instructions of: establishing an RRC connection with a first cell of the NTN; receiving a collaborator cell configuration message from the first cell, wherein the collaborator cell configuration message comprises at least one collaborator cell configuration associated with at least one cell of the NTN; initiating a RRC connection recovery procedure, after receiving the collaborator cell configuration message; selecting a second cell for the RRC connection recovery procedure, when initiating the RRC connection recovery procedure; and performing the RRC connection recovery procedure with the second cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
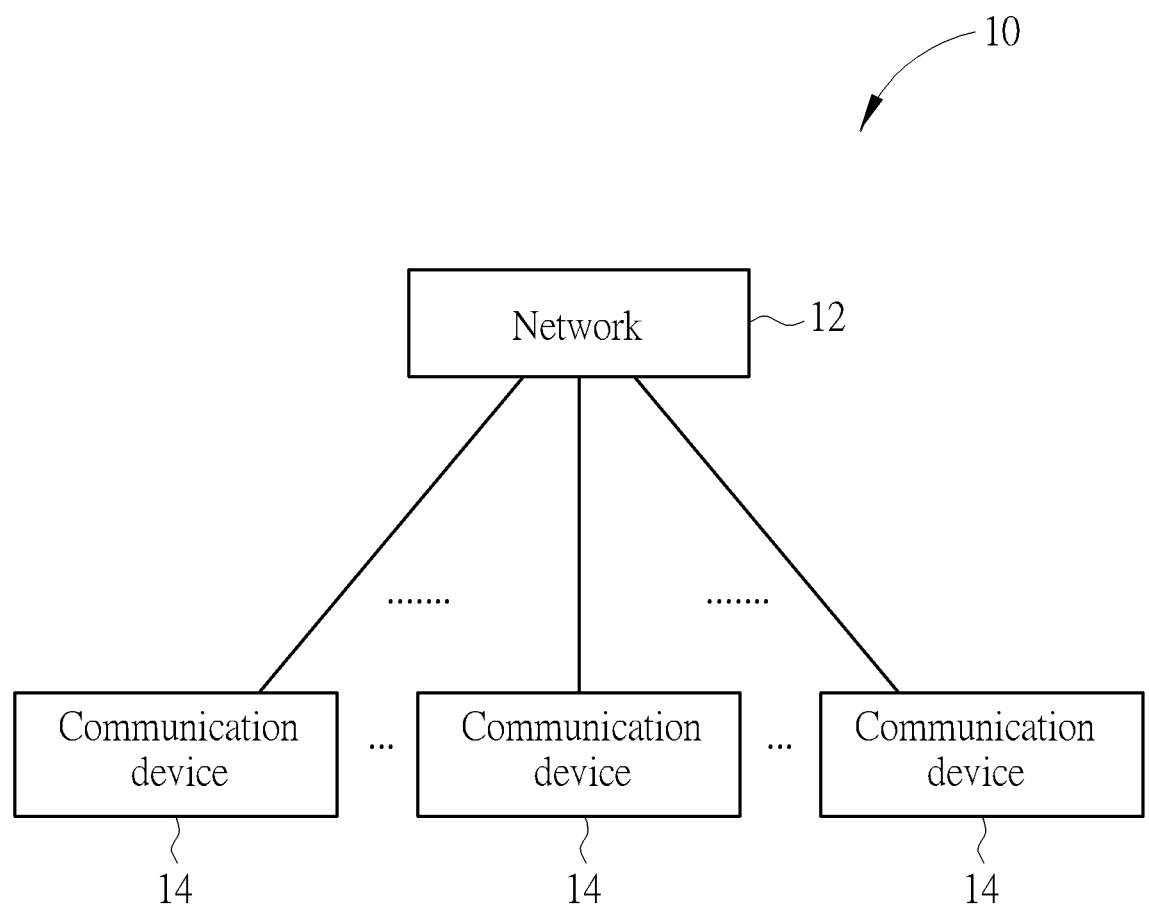
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 12 and a plurality of communication devices 14. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network 12 and a communication device 14 may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network 12 and a communication device 14 may communicate with each other via multiple serving cells (e.g., multiple serving carriers) including a primary cell (e.g., primary component carrier) and one or more secondary cells (e.g., secondary component carriers).

In FIG. 1, the network 12 and the communication devices 14 are simply utilized for illustrating the structure of the wireless communication system 10. Practically, the network 12 may be a universal terrestrial radio access network (UTRAN) including at least one Node-B (NB) in a universal mobile telecommunications system (UMTS). In one example, the network 12 may be an evolved UTRAN (E-UTRAN) including at least one evolved NB (eNB) and/or at least one relay node in a long term evolution (LTE) system, an LTE-Advanced (LTE-A) system, an evolution of the LTE-A system, etc. In one example, the network 12 may be a next generation radio access network (NG-RAN) including at least one next generation Node-B (gNB) and/or at least one fifth generation (5G) base station (BS). In one example, the gNB or the 5G BS of network 12 may include a NTN Gateway and a NTN payload. In one example, the network 12 may be any BS conforming to a specific communication standard to communicate with a communication device 14.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network 12 may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), Access and Mobility Management Function (AMF), Session Management Function (SMF), User Plane Function (UPF), Authentication Server Function (AUSF), etc. In one example, after the network 12 receives information transmitted by a communication device 14, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device 14 may be a user equipment (UE), a Very Small Aperture Terminal (VSAT), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network 12 and the communication device 14 can be seen as a transmitter or a receiver according to direction (i.e., transmission direction), e.g., for an uplink (UL), the communication device 14 is the transmitter and the network 12 is the receiver, and for a downlink (DL), the network 12 is the transmitter and the communication device 14 is the receiver.

Figure 2:
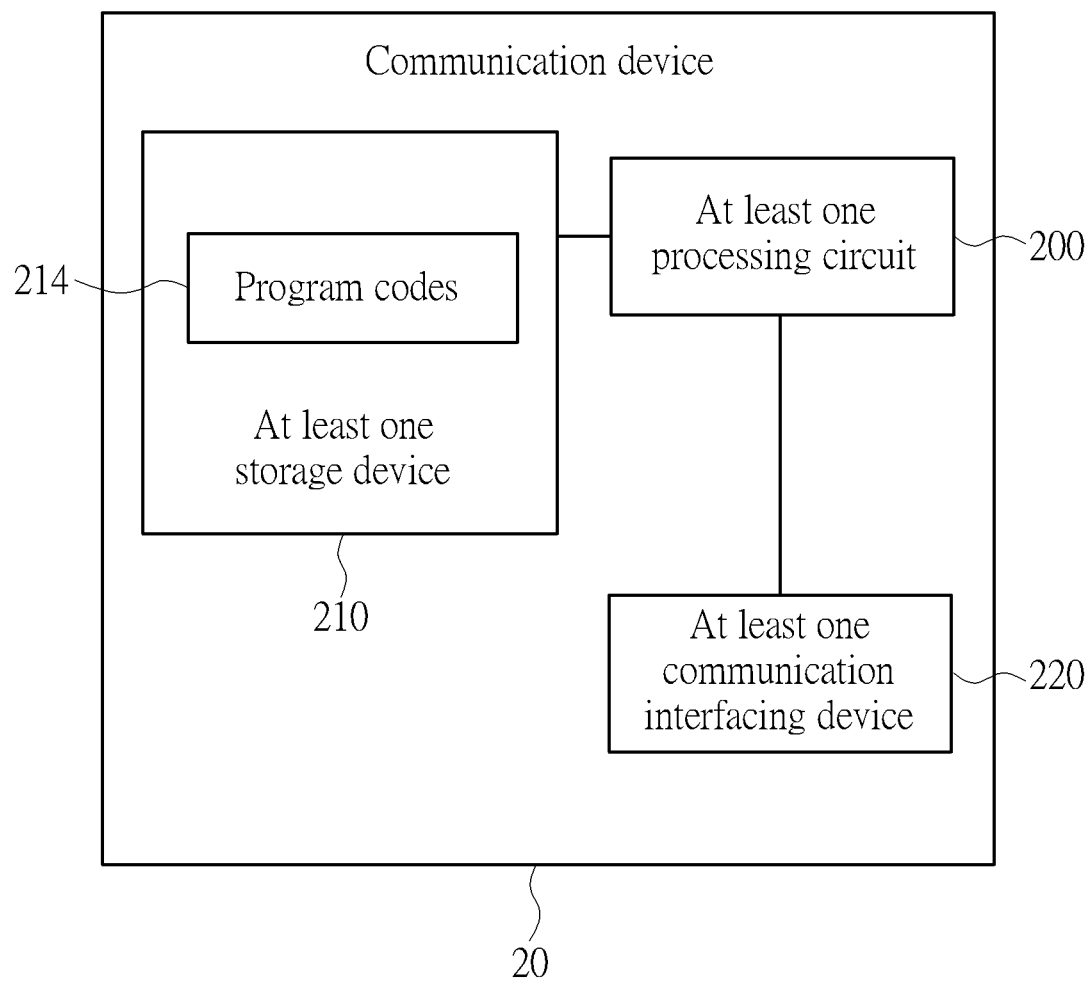
FIG. 2 is a schematic diagram of a communication device according to an example of the present invention.

FIG. 2 is a schematic diagram of a communication device 20 according to an example of the present invention. The communication device 20 may be a communication device 14 or the network 12 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include, but are not limited to, a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
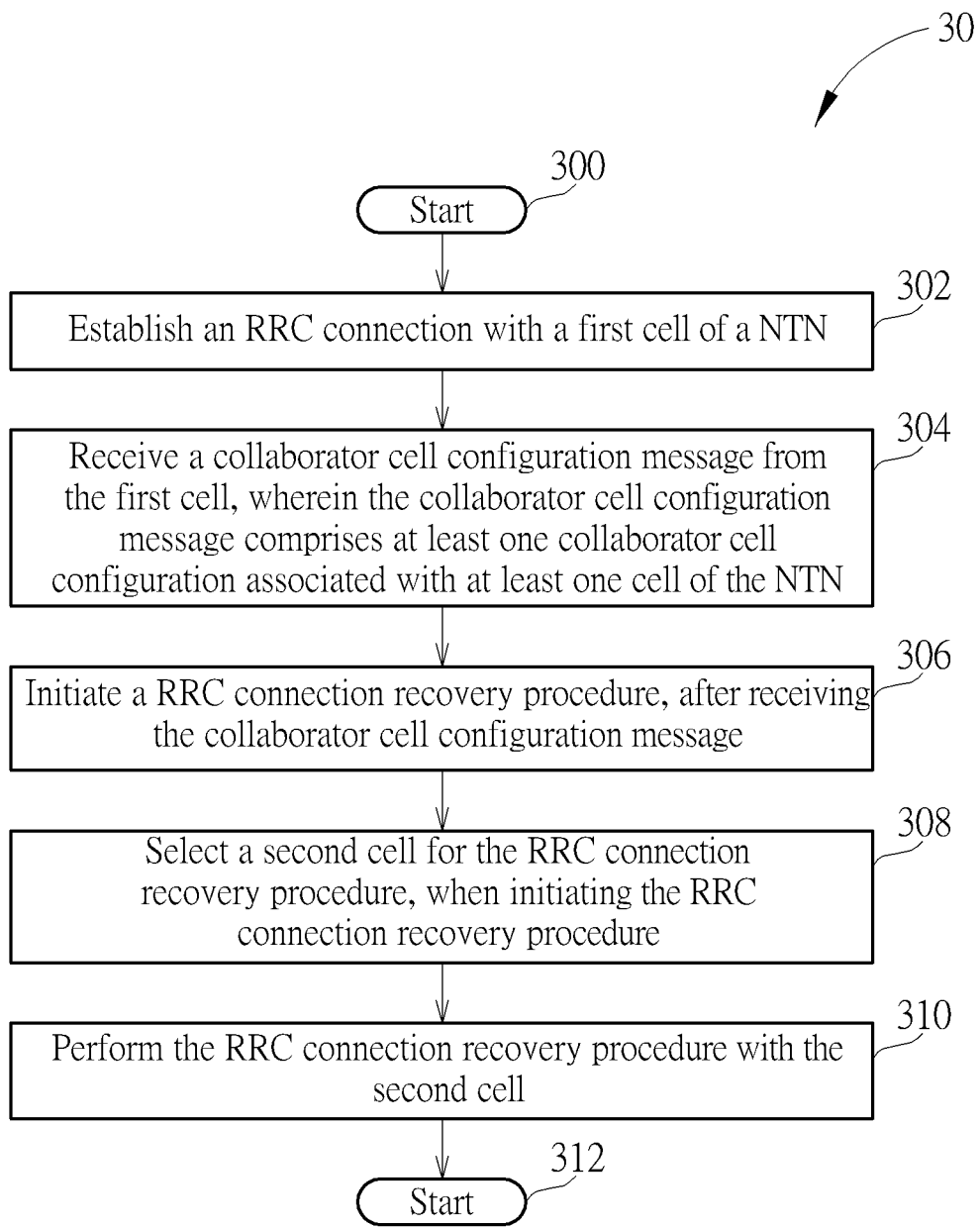
FIG. 3 is a flowchart of a process according to an example of the present invention.

FIG. 3 is a flowchart of a process 30 according to an example of the present invention. The process 30 may be utilized in a communication device (e.g., the communication device 20 in FIG. 2), to handle a recovery of a radio resource control (RRC) connection of a non-terrestrial network (NTN). The process 30 may be compiled into the program codes 214 and includes the following steps:

Step 300: Start.

Step 302: Establish an RRC connection with a first cell of a NTN.

Step 304: Receive a collaborator cell configuration message from the first cell, wherein the collaborator cell configuration message comprises at least one collaborator cell configuration associated with at least one cell of the NTN.

Step 306: Initiate a RRC connection recovery procedure, after receiving the collaborator cell configuration message.

Step 308: Select a second cell for the RRC connection recovery procedure, when initiating the RRC connection recovery procedure.

Step 310: Perform the RRC connection recovery procedure with the second cell.

Step 314: End.

According to the process 30, the communication device 20 establishes an RRC connection with a first cell of the NTN. The communication device 20 triggers a state transition to a connected mode and enters a connected mode (i.e., the access stratum of the mobile device 20 is in a RRC CONNECTED state). The communication device 20 receives a collaborator cell configuration message from the first cell. The collaborator cell configuration message comprises the at least one collaborator cell configuration associated with at least one cell of the NIN (e.g., at least one collaborator cell). A collaborator cell is a NTN cell associated with one of the at least one collaborator cell configuration. The communication device 20 initiates a RRC connection recovery procedure, after receiving the collaborator cell configuration message. The communication device 20 selects a second cell for the RRC connection recovery procedure, when (e.g., upon) initiating the RRC connection recovery procedure. The communication device 20 performs the RRC connection recovery procedure with the second cell.

Realization of the process 30 is not limited to the above description. The following examples may be applied to realize the process 30.

In one example, the first cell and the second cell are configured (e.g., served) by the same network entity (e.g., a gNB). In one example, the first cell and the second cell are configured by different network entities (e.g., different gNBs).

In one example, the at least one cell of the NTN receives a collaborator cell request message from the first cell, and transmits a collaborator cell response message to the first cell in response to the collaborator cell request message. Then, the first cell transmits a collaborator cell configuration message comprising information comprised in the collaborator cell response message to the communication device 20.

In one example, the collaborator cell request message comprises mandatory information and optional information. The mandatory information comprises at least one of an identity of the first cell, an identity of the communication device 20 (e.g., a cell radio network temporary identifier (C-RNTI) of the communication device 20), a security verification information for the communication device 20 (e.g., a Message Authentication Code-Integrity (MAC-1) or a short MAC-1), an access stratum (AS) security configuration configured by and applied to the first cell. The optional information comprises at least one SRB (e.g., SRB1 and/or SRB2) configuration and/or at least one DRB configuration (e.g., a default DRB configuration).

In one example, the collaborator cell response message comprises at least one of cell access information for the at least one cell of the NTN (e.g., random access resource configuration information for the communication device 20 to perform random access with the collaborator cell, the system information associated with the collaborator cell), or a move-in identity of the communication device 20 (e.g., an identity to be utilized for the collaborator cell to identify the communication device 20).

In one example, the at least one cell of the NiN receives a handover request message from the first cell, and transmits a handover acknowledge (ACK) message to the first cell in response to the handover request message. The first cell generates at least one handover configuration according to the reception of the handover ACK message, and transmits the at least one handover configuration to the communication device 20. In one example, the communication device 20 is configured with a handover configuration of the at least one handover configuration.

There are various alternatives to perform the RRC connection recovery procedure. In one example, the communication device 20 performs a RRC connection re-establishment procedure as the RRC connection recovery procedure. In detail, the communication device 20 performs the RRC connection re-establishment procedure with the second cell according to a collaborator cell configuration associated with the second cell, when the communication device 20 is configured with the collaborator cell configuration of the at least one collaborator cell configuration. In one example, the communication device 20 performs a RRC connection reconfiguration procedure (e.g., a handover or a conditional handover) as the RRC connection recovery procedure. In detail, the communication device 20 performs the RRC connection reconfiguration procedure with the second cell according to a handover configuration associated with the second cell, when the communication device is configured with the handover configuration of the at least one handover configuration. In one example, the communication device 20 performs a RRC connection re-establishment procedure with the second cell according to system information associated with the second cell, when the second cell is not associated with the at least one collaborator cell configuration associated with the at least one cell of the NTN (e.g., a cell other than the at least one cell of the NTN) and the communication device is not configured with a valid handover configuration associated with the second cell. In one example, the communication device 20 performs a random access procedure with the second cell. In one example, the communication device 20 transmits a RRC connection recovery request message to the second cell in the random access procedure.

In one example, the collaborator cell configuration associated with the second cell is a collaborator cell configuration of the at least one collaborator cell configuration comprised in the collaborator cell configuration message. In one example, the collaborator cell configuration is a handover configuration, and the handover configuration comprises a "ReconfigurationWithSync" associated with a NTN cell (e.g., the at least one cell of the NTN). In one example, the at least one handover configuration comprises at least one execution condition associated with the at least one cell of the NTN, respectively. That is, the at least one execution condition is associated with the at least one handover configuration, respectively. In one example, the RRC connection recovery request message comprises at least one of an identity of the communication device 20 to be applied in the second cell, an identity of the first cell, or an identity to be utilized by the second cell to perform authentication of the communication device 20. In one example, the random access procedure is a 2-step random access procedure or a 4-step random access procedure.

In one example, the communication device 20 enters to an idle mode (i.e., the access stratum part of the communication device 20 is in RRC IDLE state) from a connected mode, when failing to select the second cell.

In one example, the collaborator cell configuration message comprises a validity time associated with the at least one collaborator cell configuration associated with the at least one cell of the NTN. The validity time may be indicated by a starting time, a period of time comprising a starting time and a time duration, a period of time comprising a starting time and a stopping time, a period of time comprising a starting time and a timer, or a timer. The collaborator cell configuration associated with the at least one cell of the NTN is considered to be valid in the validity time.

In one example, the collaborator cell configuration of the at least one collaborator cell configuration comprises a validity period that the collaborator cell configuration is considered as valid in the validity period or a validity area that the collaborator cell configuration is considered as valid in the validity area. The validity period may be indicated by a period of time comprising a starting time and a time duration, a period of time comprising a starting time and a stopping time, a period of time comprising a starting time and a timer, or a timer. The collaborator cell configuration associated with the at least one cell of the NTN is considered to be valid in the validity period. The validity area may be indicated by the first cell and be included in the collaborator cell configuration message by at least one identity associated with at least one geographical area, at least one identity associated with at least one NTN tracking area, at least one identity associated with at least one NTN cell (e.g., the at least one cell of the NTN) or at least one identity associated with at least one identity of at least one NTN cell (e.g., a list or a set of the at least one cell of the NTN). A mapping of the at least one identity with the at least one geographical area is configured by the NTN and is provided (e.g., transmitted) to a communication device 20 via a NTN cell. The collaborator cell configuration associated with the at least one cell of the NTN is considered to be valid in the validity area.

In one example, the collaborator cell configuration of the at least one collaborator cell configuration comprises at least one of a cell identity associated with a cell (e.g., the second cell) of the at least one cell of the NTN, at least one frequency associated with the cell of the at least one cell of the NTN, at least one frequency associated with at least one reference signal of the cell of the at least one cell of the NTN, or the information to access the cell of the at least one cell of the NTN. In one example, the information to access the cell comprises at least one configuration of random access resource associated with the cell for the communication device 20 to perform the random access procedure with the cell. In one example, the at least one collaborator cell configuration comprises at least one of at least one synchronization signal block (SSB)-based radio resource management (RRM) measurement timing configuration (SMTC) associated with a frequency associated with the cell, an identity of the communication device 20 to be applied in the cell, or an identity to be utilized by the cell to perform authentication for the communication device 20.

In one example, the communication device 20 selects the second cell by performing at least one evaluation (or performing the at least one evaluation and at least one measurement) according to a cell selection configuration configured by system information of the first cell. In one example, the communication device 20 selects the second cell by performing at least one evaluation (or performing the at least one evaluation and at least one measurement) according to the at least one collaborator cell configuration associated with at least one cell of the NTN comprised in the collaborator cell configuration message. In one example, the communication device 20 selects the second cell by performing at least one evaluation (or performing the at least one evaluation and at least one measurement) according to a handover configuration of at least one handover configuration.

Furthermore, there are other alternatives to select the second cell for the RRC connection recovery procedure. In one example, the communication device 20 performs at least one evaluation (or performs the at least one evaluation and at least one measurement) according to the at least one collaborator cell configuration associated with the at least one cell of the NTN, when the communication device is configured with at least one collaborator cell configuration associated with the at least one cell of the NTN and the communication device is configured with a handover configuration of at least one handover configuration. In one example, the communication device 20 performs at least one evaluation (or performs the at least one evaluation and at least one measurement) according to a handover configuration of at least one handover configuration, when the communication device is configured with the at least one collaborator cell configuration associated with the at least one cell of the NTN, the communication device is configured with the handover configuration of the at least one handover configuration and the handover configuration is considered as valid.

In one example, the communication device 20 initiates the RRC connection recovery procedure, after failing to perform a handover according to the handover configuration. In one example, the communication device 20 initiates the RRC connection recovery procedure, before any one of the at least one execution condition is satisfied.

Figure 4:
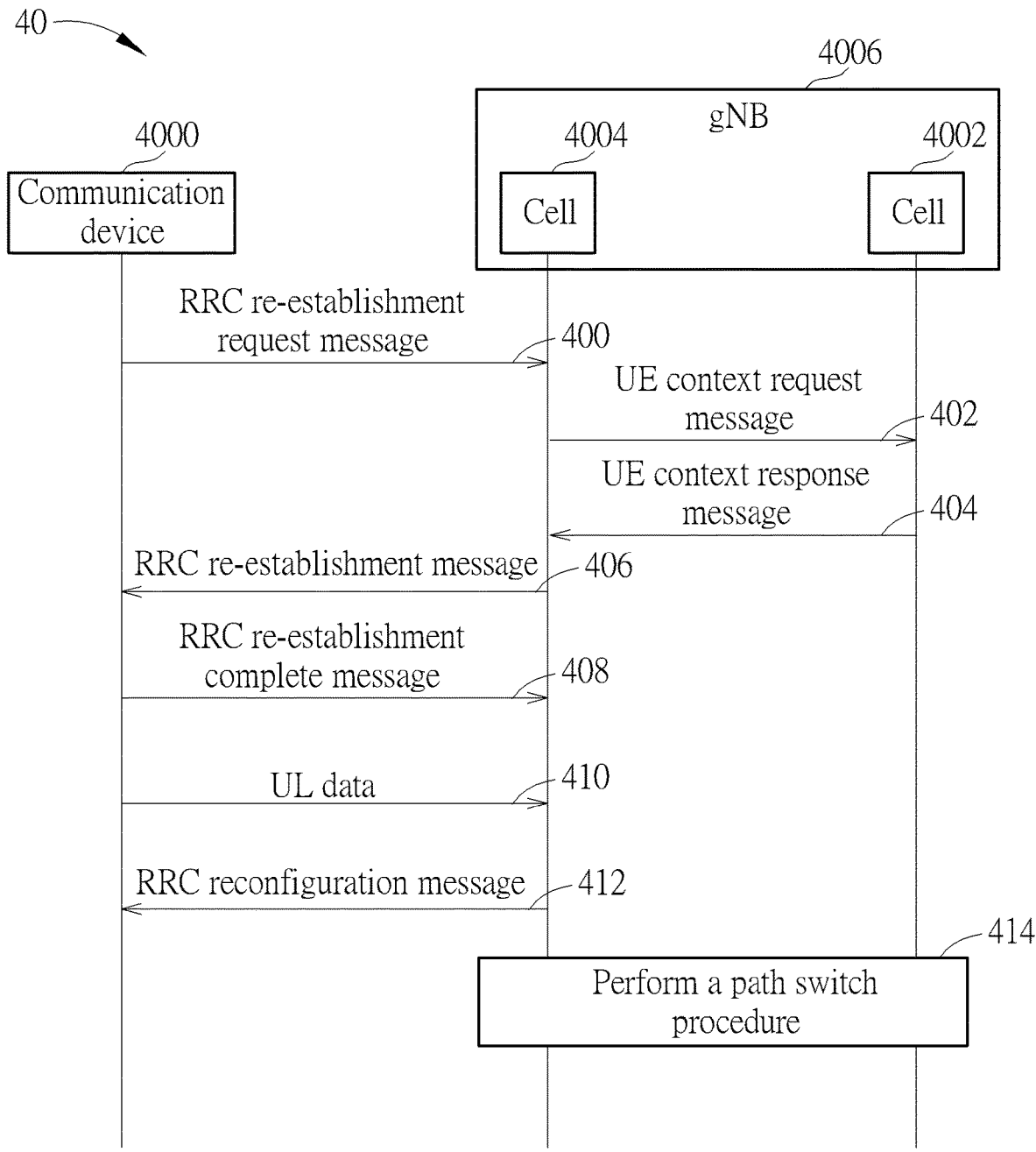
FIG. 4 is a sequence diagram of a process according to an example of the present invention.

FIG. 4 is a sequence diagram of a process 40 according to an example of the present invention. The process 40 is performed by a communication device 4000 (e.g., the communication device 20 in FIG. 2), a cell 4002 (e.g., the first cell in the process 30) and a cell 4004 (e.g., the second cell in the process 30). The cells 4002 and 4004 are configured by a gNB 4006, and the cell 4002 is a serving cell of the communication device 4000. First, the communication device 4000 in a connected mode transmits a RRC re-establishment request message to the cell 4004 (Step 400). The cell 4004 transmits a UE context request message to the cell 4002 (Step 402) if UE context of the communication device 4000 is not available in the cell 4004, and receives a UE context response message from the cell 4002 (Step 404). The cell 4004 transmits a RRC re-establishment message to the communication device 4000 (Step 406) if UE context of the communication device 4000 is available in the cell 4004, to resume an AS security and radio bearers for the communication device 4000. The communication device 4000 transmits a RRC re-establishment complete message to the cell 4004 (Step 408). Accordingly, the communication device 4000 transmits UL data to the cell 4004 (Step 410) if UL resource is indicated by the cell 4004 for UL transmissions, and may receive a RRC reconfiguration message from the cell 4004 (Step 412). The cells 4002 and 4004 perform a path switch procedure (Step 414), may with involving core network entities (not shown).

In FIG. 4, the cells 4002 and 4004 are configured by the same gNB. Steps 402 and 404 are the intra-gNB behaviors resulting in a short latency. In one example, the cell 4004 retrieves the UE context of the communication device 4000 stored in the gNB 4006, after authenticating the communication device 4000.

Figure 5:
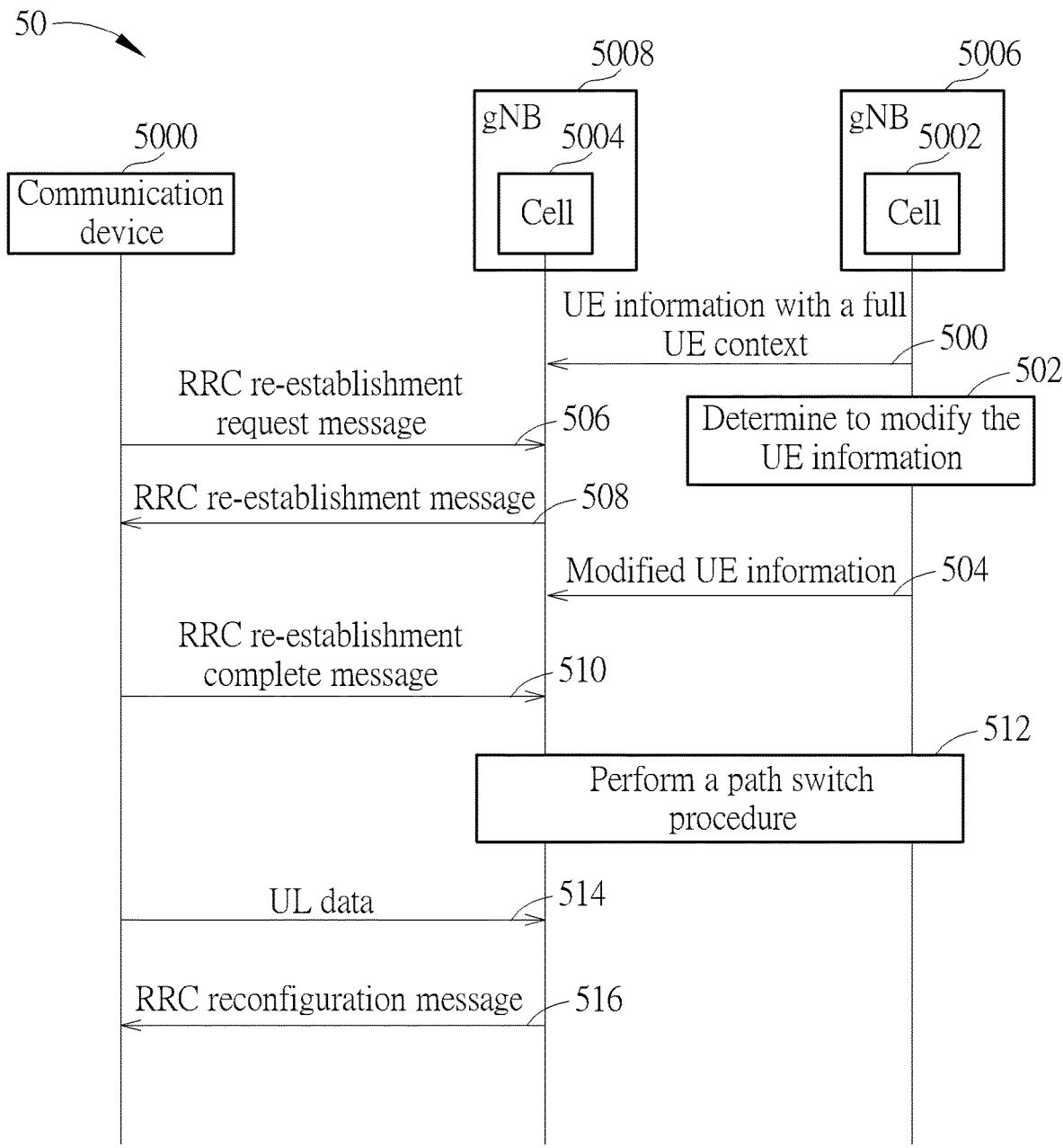
FIG. 5 is a sequence diagram of a process according to an example of the present invention.

FIG. 5 is a sequence diagram of a process 50 according to an example of the present invention. The process 50 is performed by a communication device 5000 (e.g., the communication device 20 in FIG. 2), a cell 5002 (e.g., the first cell in the process 30) and a cell 5004 (e.g., the second cell in the process 30). The cell 5002 is configured by a gNB 5006, and is a serving cell of the communication device 5000. The cell 5004 is configured by a gNB 5008. First, the cell 5002 transmits UE information (e.g., with a full UE context) of the communication device 5000 to the cell 5004 (Step 500).

The communication device 5000 in a connected mode transmits a RRC re-establishment request message to the cell 5004 (Step 506). The cell 5004 transmits a RRC re-establishment message to the communication device 5000 (Step 508). The RRC re-establishment message is used for resuming an AS security and establishing at least one signaling radio bearer (SRB), and may further used for establishing at least one data radio bearer (DRB). The communication device 5000 transmits a RRC re-establishment complete message to the cell 5004 (Step 510). The cells 5002 and 5004 may perform a path switch procedure (Step 512), may with involving core network entities (not shown). Before performing a path switch procedure between cell 5002 and cell 5004, if cell 5002 determines to modify (e.g., update) the UE information (Step 502), the cell 5002 may transmit the modified (e.g., updated) UE information to the cell 5004 (Step 504). The communication device 5000 transmits UL data to the cell 5004 after transmitting the RRC re-establishment complete message (Step 514) if UL resource is indicated by the cell 4004 for UL transmissions, and may receive a RRC reconfiguration message from the cell 5004 (Step 506).

In FIG. 5, the cells 5002 and 5004 are configured by different gNBs. The cell 5002 transmits the UE information to the cell 5004 in advance. In one example, the cell 5004 activates the AS security and establishes a RRC connection for the communication device 5000 according to the UE information, when the cell 5004 is selected by the communication device 5000 and the cell 5004 receives the RRC re-establishment request message from the communication device 5000.

In FIG. 5, the cells 5002 and 5004 perform the path switch procedure, may with involving core network entities (not shown), to switch connections (e.g., packet data unit (PDU) sessions and/or packet data network (PDN) connections) for the communication device 5000. In one example, during the path switch procedure, the cell 5004 informs a core network entity (not shown) to communicate (e.g., transmit or receive) packets (e.g., user plane packets, packet data units) for the communication device 5000 with (e.g., to or from) the cell 5004 and stop communicating the packets for the communication device 5000 with the cell 5002.

Figure 6:
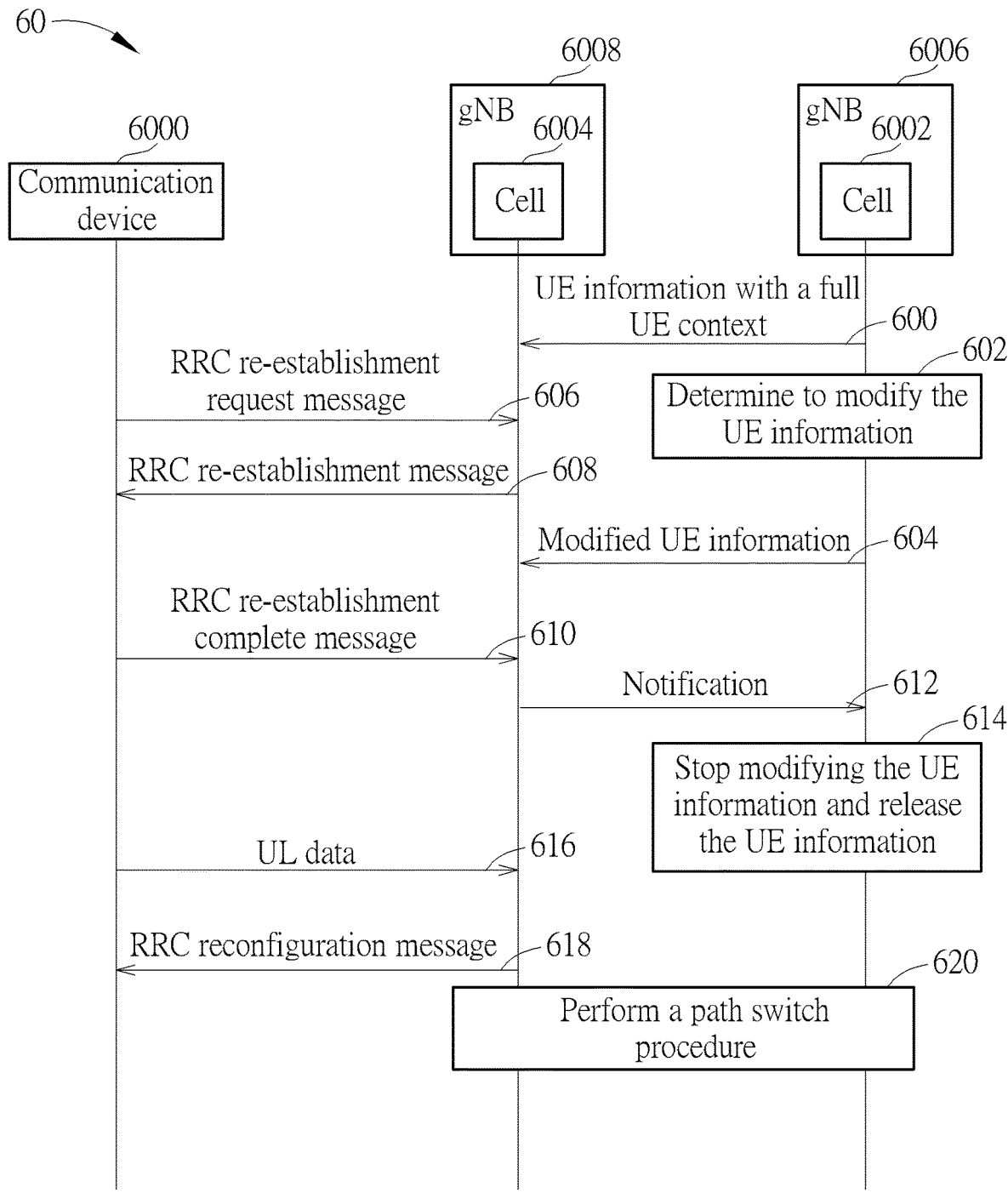
FIG. 6 is a sequence diagram of a process according to an example of the present invention.

FIG. 6 is a sequence diagram of a process 60 according to an example of the present invention. The process 60 is performed by a communication device 6000 (e.g., the communication device 20 in FIG. 2), a cell 6002 (e.g., the first cell in the process 30) and a cell 6004 (e.g., the second cell in the process 30). The cell 6002 is configured by a gNB 6006, and is a serving cell of the communication device 6000. The cell 6004 is configured by a gNB 6008. The Steps 600-610 can be referred to the Steps 500-510 in FIG. 5, and are not narrated herein for brevity. The cell 6004 may transmit a notification to the cell 6002 (Step 612), after successfully receiving the RRC re-establishment request message from the communication device 6000 (Step 606), after successfully transmitting the RRC re-establishment message to the communication device 6000 (Step 608), or after successfully receiving RRC re-establishment complete message from the communication device 6000 (Step 610). Before receiving the notification from the cell 6004 (Step 602), the cell 6002 may transmit modification UE information to the cell 6004 (Step 604). After receiving the notification transmitted from the cell 6004 (Step 612), the cell 6002 stops modifying (e.g., updating) the UE information and releases the UE information, in response to the notification (Step 614). The communication device 6000 transmits UL data to the cell 6004 after transmitting the RRC re-establishment complete message (Step 616) if UL resource is indicated by the cell 6004 for UL transmissions, and may receive a RRC reconfiguration message from the cell 6004 (Step 618). The cells 6002 and 6004 perform a path switch procedure (Step 620), may with involving core network entities (not shown).

In FIG. 6, the cells 6002 and 6004 are configured by different gNBs. The cell 6002 transmits the UE information to the cell 6004 in advance. In one example, the cell 6004 activates the AS security and establishes a RRC connection for the communication device 6000 according to the UE information, when the cell 6004 is selected by the communication device 6000 and the cell 6004 receives the RRC re-establishment request message from the communication device 6000. In one example, the cell 6004 transmits the notification to inform the cell 6002 to stop modifying/transmitting the UE information, after receiving the RRC re-establishment request message and successfully authenticating the communication device 6000.

In FIG. 6, the cells 6002 and 6004 perform the path switch procedure, to switch connections (e.g., PDU sessions and/or PDN connections) for the communication device 6000. In one example, during the path switch procedure, the cell 6004 informs a core network (not shown) to communicate (e.g., transmit or receive) packets (e.g., user plane packets) for the communication device 6000 with (e.g., to or from) the cell 6004 and stop communicating the packets for the communication device 6000 with the cell 6002.

Figure 7:
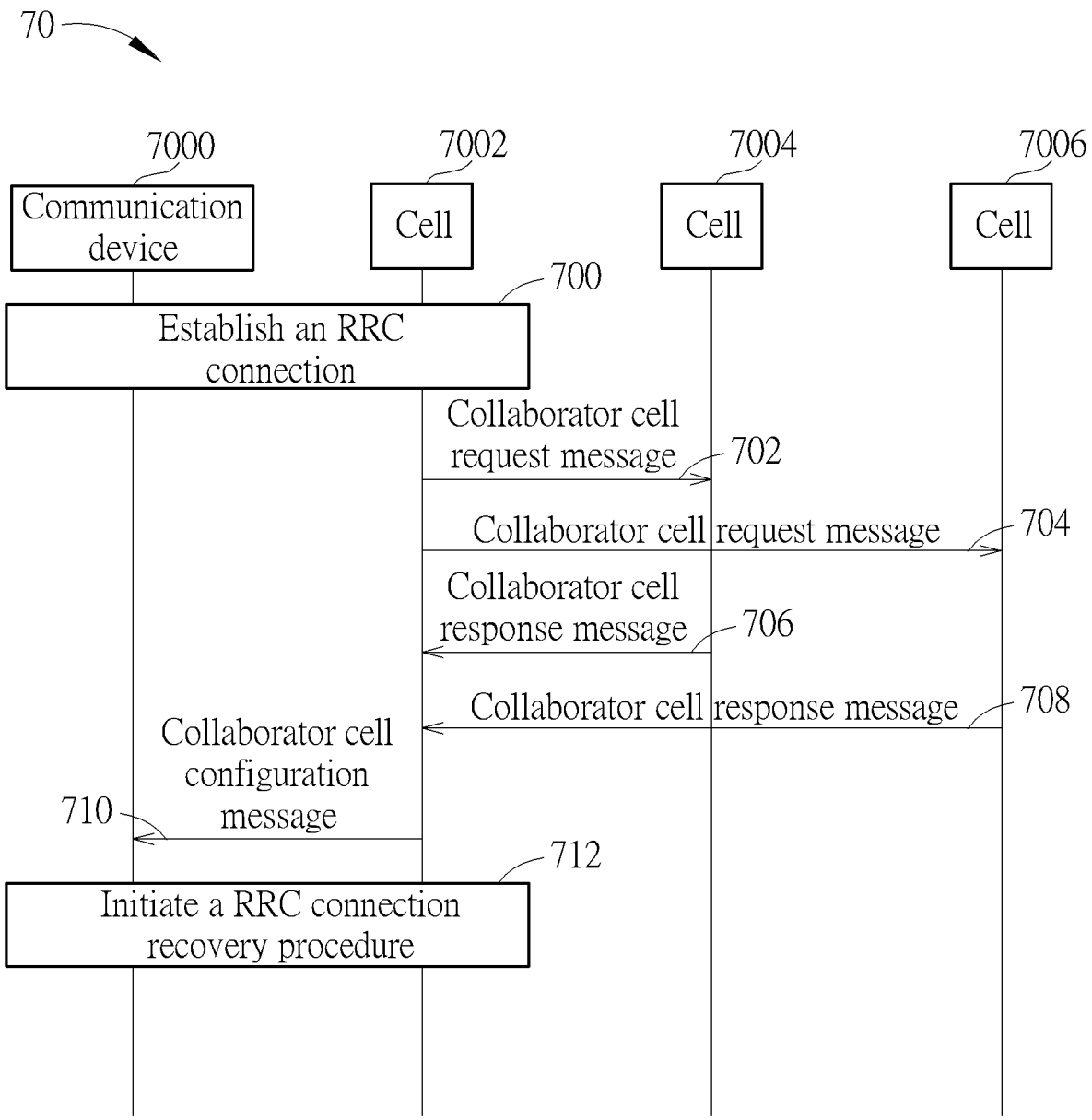
FIG. 7 is a sequence diagram of a process according to an example of the present invention.

FIG. 7 is a sequence diagram of a process 70 according to an example of the present invention. The process 70 is performed by a communication device 7000 (e.g., the communication device 20 in FIG. 2), a cell 7002 (e.g., the first cell in the process 30) and a cell 7004 (e.g., the at least one cell of the NTN in the process 30), and may be further performed by a cell 7006 (e.g., the at least one cell of the NTN in the process 30). The cell 7002 is a NTN serving cell of the communication device 7000. First, the communication device 7000 establishes an RRC connection with the cell 7002 (successfully) (Step 700). The cell 7002 transmits a collaborator cell request message to the cell 7004 (Step 702) and may transmit the collaborator cell request message to the cell 7006 (Step 704), to negotiate with the cell 7004 (or with the cells 7004 and 7006). Each of the cells 7004 and 7006 transmits one collaborator cell response message to the cell 7002 in response to the collaborator cell request message (Steps 706 and 708, respectively). The cell 7002 transits a collaborator cell configuration message to the communication device 7000 (Step 710), after receiving the collaborator cell response message(s) from the cell 7004 (or from the cells 7004 and 7006). The communication device 7000 initiates a RRC connection recovery procedure with the cell 7002 (Step 712).

In one example, the cell 7002 comprises a SRB0 and a SRB1. In one example, the cell 7002 further comprises at least one of at least one other SRB or at least one DRB. In one example, the cell 7002 determines collaborator cell(s) (e.g., the cells 7004 and 7006) for the communication device 7000 according to, for example, a network deployment, a network policy, or UE information or measurement report(s) received from the communication device 7000, to perform the RRC connection recovery procedure.

In one example, the cell 7002 generates the collaborator cell configuration message comprising collaborator cell configurations of the cells 7004 and 7006 according to the collaborator cell response messages. In one example, the cell 7002 modifies the collaborator cell configurations of the cells 7004 and 7006 (e.g., adds, changes, removes a part of or all content of the collaborator cell configurations) by transmitting another collaborator cell configuration message to the communication device 7000.

Figure 8:
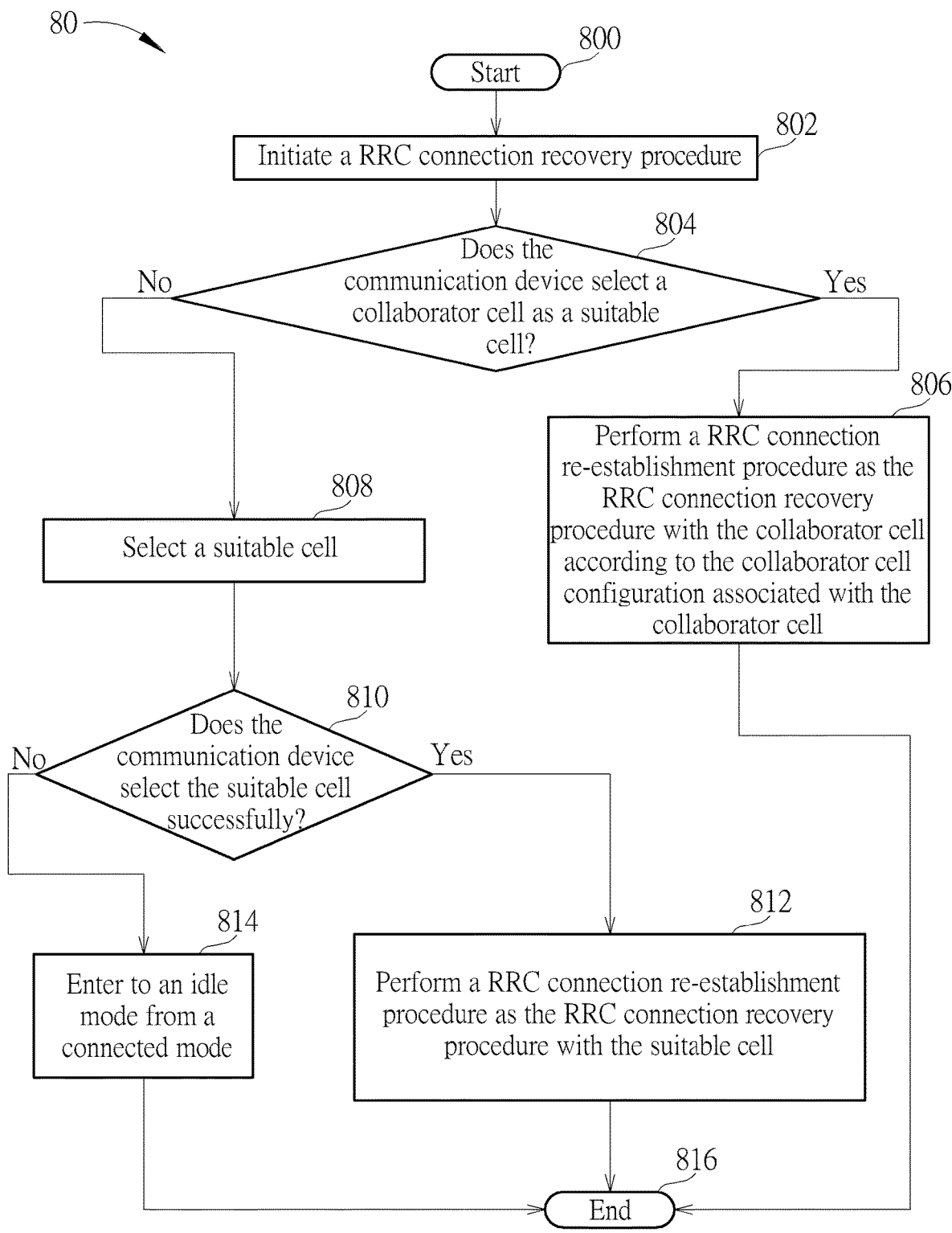
FIG. 8 is a flowchart of a process according to an example of the present invention.

FIG. 8 is a flowchart of a process 80 according to an example of the present invention. The process 80 may be utilized in a communication device (e.g., the communication device 20 in FIG. 2 or the communication device 7000 in FIG. 7). The process 80 includes the following steps:

Step 800: Start.

Step 802: Initiate a RRC connection recovery procedure.

Step 804: Does the communication device select a collaborator cell (e.g., one of the cells 7004 and 7006 in FIG. 7) as a suitable cell (a cell on which a communication device may camp, e.g., the second cell in the process 30)? If yes, perform Step 806. If no, perform Step 808.

Step 806: Perform a RRC connection re-establishment procedure as the RRC connection recovery procedure with the collaborator cell according to the collaborator cell configuration associated with the collaborator cell, and perform Step 816.

Step 808: Select a suitable cell.

Step 810: Does the communication device select the suitable cell successfully? If yes, perform Step 812. If no, perform Step 814.

Step 812: Perform a RRC connection re-establishment procedure as the RRC connection recovery procedure with the suitable cell, and perform Step 816.

Step 814: Enter to an idle mode from a connected mode.

Step 816: End.

In the Step 802, if the communication device is configured with at least one collaborator cell configuration associated with at least one cell of the NTN and the at least one collaborator cell configuration is considered as valid, the communication device performs suitable cell (a cell on which a communication device may camp, e.g., the second cell in the process 30) evaluation according to the at least one collaborator cell configuration to select a suitable cell (e.g., only performs suitable cell evaluation among the cells that the identity of the cell, the frequency of the cell, or the frequency of the reference signal(s) of the cell is comprised in one of the at least one collaborator cell configuration).

The communication device may perform cell search and measurements according to the at least one collaborator cell configuration, before performing the suitable cell evaluation.

If a suitable cell is selected in the Step 802 and the suitable cell is a collaborator cell, the Step 806 is performed. In the Step 806, the communication device initiates a RRC re-establishment procedure as a RRC connection recovery procedure with the suitable cell according to the collaborator cell configuration associated with the suitable cell. The RRC re-establishment procedure may comprise a random access procedure between the communication device and the suitable cell.

In the Step 804, the communication device determines whether the suitable cell is one of the collaborator cell according to the collaborator cell configuration(s)

If a suitable cell is not selected in the Step 802, the Step 808 is performed. In the Step 808, the communication device selects a suitable cell. The selection of the suitable cell may comprise performing at least one evaluation (or performing the at least one evaluation and at least one measurement) according to a cell selection configuration configured by system information of the serving cell of the communication device (i.e., the first cell in the process 30), or according to a stored cell selection configuration configured by the serving cell or by the previous serving cell of the communication device.

In the Step 810, if a suitable cell is found according to the process in the Step 808, the communication device performs the Step 812. Otherwise, the communication device performs the Step 814. In the step 812, the communication device initiates a RRC re-establishment procedure as a RRC connection recovery procedure with the suitable cell. The RRC re-establishment procedure may comprise a random access procedure between the communication device and the suitable cell. The information required to access the suitable cell may be obtain from the system information associated with the suitable cell obtained by the communication device (e.g., the communication device may acquire the system information of the suitable cell from the system information broadcast by the suitable cell), or may be configured from previous serving cell and is stored by the communication device. In the Step 814, the communication device enters an idle mode from a connected mode. An idle mode procedure may be initiated by the communication device accordingly.

In the process 80, if a suitable cell is selected successfully and the suitable cell is a collaborator cell, the communication device performs a RRC connection re-establishment procedure as the RRC connection recovery procedure with the collaborator cell according to the collaborator cell configuration associated with the collaborator cell. If a suitable cell is selected successfully and the suitable cell is not a collaborator cell, the communication device performs a RRC connection re-establishment procedure as the RRC connection recovery procedure with the suitable cell according to, for example, the system information associated with the suitable cell, or the stored information that may be configured by the serving cell or by a previous serving cell.

Figure 9:
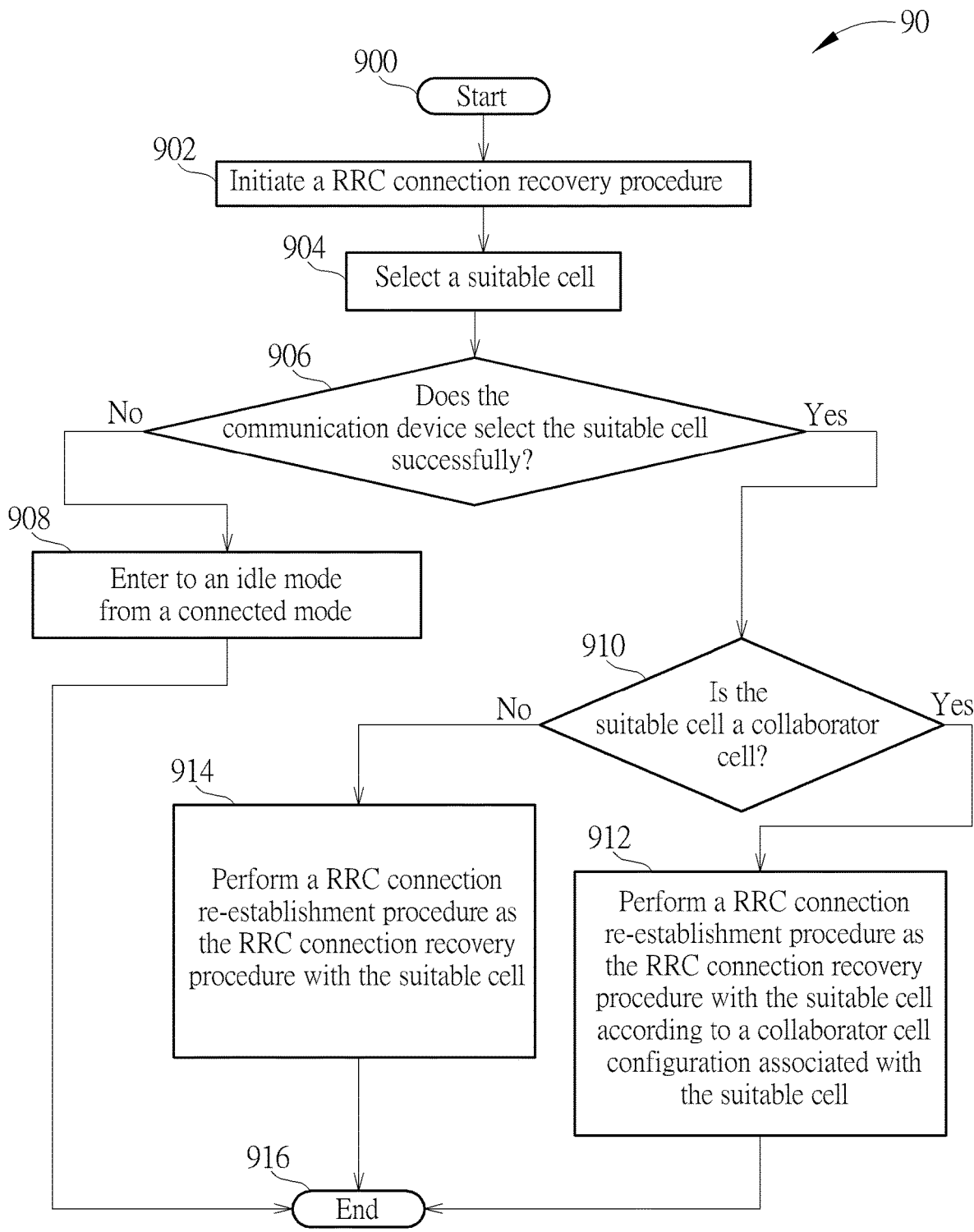
FIG. 9 is a flowchart of a process according to an example of the present invention.

FIG. 9 is a flowchart of a process 90 according to an example of the present invention. The process 90 may be utilized in a communication device (e.g., the communication device 20 in FIG. 2 or the communication device 7000 in FIG. 7). The process 90 includes the following steps:

Step 900: Start.

Step 902: Initiate a RRC connection recovery procedure.

Step 904: Select a suitable cell (a cell on which a communication device may camp, e.g., the second cell in the process 30).

Step 906: Does the communication device select the suitable cell successfully? If yes, perform Step 910. If no, perform Step 908.

Step 908: Enter to an idle mode from a connected mode, and perform Step 916.

Step 910: Is the suitable cell a collaborator cell (e.g., one of the cells 7004 and 7006 in FIG. 7)? If yes, perform Step 912. If no, perform Step 914.

Step 912: Perform a RRC connection re-establishment procedure as the RRC connection recovery procedure with the suitable cell according to a collaborator cell configuration associated with the suitable cell, and perform Step 916.

Step 914: Perform a RRC connection re-establishment procedure as the RRC connection recovery procedure with the suitable cell.

Step 916: End.

In the Step 904, the communication device selects a suitable cell. The selection of the suitable cell may comprise performing at least one evaluation (or performing the at least one evaluation and at least one measurement) according to a cell selection configuration configured by system information of the serving cell of the communication device (i.e., the first cell in the process 30), or according to a stored cell selection configuration configured by the serving cell or by the previous serving cell of the communication device.

In the Step 912, the communication device initiates a RRC re-establishment procedure as a RRC connection recovery procedure with the suitable cell according to the collaborator cell configuration associated with the suitable cell. The RRC re-establishment procedure may comprise a random access procedure between the communication device and the suitable cell.

In the Step 914, the RRC re-establishment procedure may comprise a random access procedure between the communication device and the suitable cell. The information required to access the suitable cell may be obtain from the system information associated with the suitable cell obtained by the communication device (e.g., the communication device may acquire the system information of the suitable cell from the system information broadcast by the suitable cell), or may be configured from previous serving cell and is stored by the communication device.

In the process 90, if a suitable cell is selected successfully and the suitable cell is a collaborator cell, the communication device performs a RRC connection re-establishment procedure as the RRC connection recovery procedure with the collaborator cell according to the collaborator cell configuration associated with the collaborator cell. If a suitable cell is selected successfully and the suitable cell is not a collaborator cell, the communication device performs a RRC connection re-establishment procedure as the RRC connection recovery procedure with the suitable cell according to, for example, the system information associated with the suitable cell, or the stored information that may be configured by the serving cell or by a previous serving cell.

Figure 10:
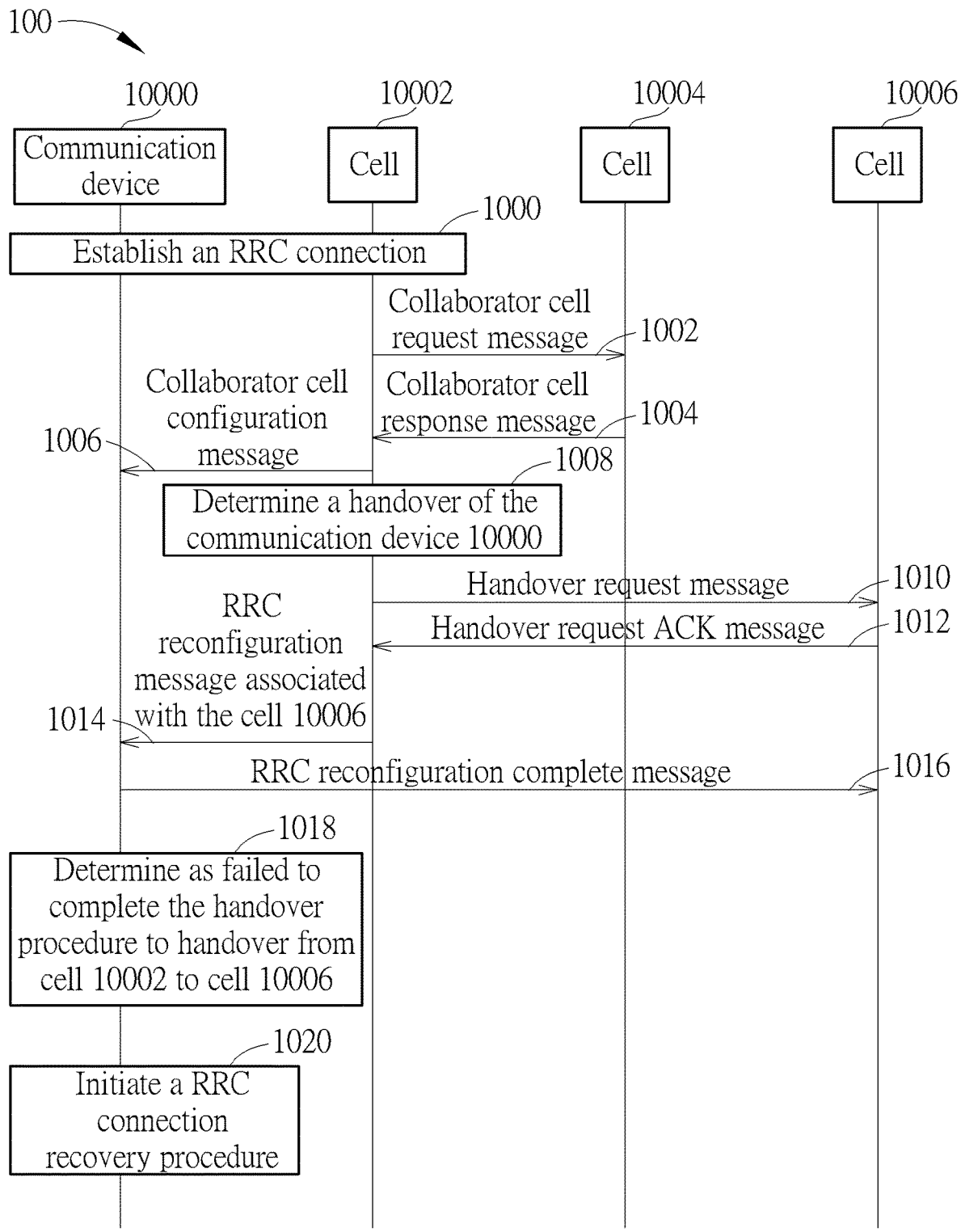
FIG. 10 is a sequence diagram of a process according to an example of the present invention.

FIG. 10 is a sequence diagram of a process 100 according to an example of the present invention. The process 100 is performed by a communication device 10000 (e.g., the communication device 20 in FIG. 2), a cell 10002 (e.g., the first cell in the process 30) and a cell 10004 (e.g., at least one cell of the NTN in the process 30), and may be further performed by a cell 10006 (e.g., the at least one cell of the NTN in the process 30). The cell 10002 is a NTN serving cell of the communication device 10000. First, the communication device 7000 establishes an RRC connection with the cell 10002 (successfully) (Step 1000). The cell 10002 transmits a collaborator cell request message to the cell 10004 (Step 1002), to negotiate with the cell 10004. The cell 10004 transmits a collaborator cell response message to the cell 10002 (Step 1004). The cell 10002 transits a collaborator cell configuration message to the communication device 10000 (Step 1006). The communication device 10000 stores at least one collaborator cell configuration comprised in the collaborator cell configuration message. The cell 10002 determines a handover of the communication device 10000 (Step 1008), and transmits a handover request message to the cell 10006 (Step 1010), to negotiate with the cell 10006. The cell 10002 receives a handover request ACK message from the cell 10006 (Step 1012), and transmits a RRC reconfiguration message associated with the cell 10006 to the communication device 10000 (Step 1014). The communication device 10000 performs a handover procedure according to the RRC reconfiguration message associated with the cell 10006. If the communication device 10000 determines as failed to complete the handover procedure to handover from cell 10002 to cell 10006 (Step 1018) (e.g., the communication device 10000 failed to detect the cell 10006, failed to perform random access procedure with the cell 10006, or failed to transit a RRC reconfiguration complete message to the cell 10006 (Step 1016)), the communication device 10000 initiates a RRC connection recovery procedure (Step 1020).

In one example, the cell 10002 comprises a SRB0 and a SRB1. In one example, the cell 10002 further comprises at least one of at least one other SRB or at least one DRB. In one example, the cell 10002 determines collaborator cell(s) (e.g., the cell 10004) for the communication device 10000 according to, for example, a network deployment, a network policy, or UE information or measurement report(s) received from the communication device 10000, to perform the RRC connection recovery procedure. In one example, the cell 10002 generates the collaborator cell configuration message comprising a collaborator cell configuration of the cell 10004 according to the collaborator cell response message.

In one example, the cell 10002 modifies the collaborator cell configuration of the cell 10004 (e.g., adds, changes, removes a part of or all content of the collaborator cell configuration) by transmitting another collaborator cell configuration message to the communication device 10000. In one example, the cell 10002 determines the handover of the communication device 10000 and determines handover cell(s) (a cell of the NTN associates with one of the at least one handover configuration comprised in the RRC reconfiguration message associated with the cell 10006 of the Step 1014, e.g., the cell 10006) for the communication device 10000 according to measurement report(s) received from the communication device 10000, the orbital information associated with the first cell and/or the cell 10006, or the service time and/or area information associated with the first cell and/or the cell 10006. In one example, the RRC reconfiguration message comprises a handover configuration with a "ReconfigurationWithSync".

In FIG. 10, the cell 10002 transmits the collaborator cell request message to the cell 10004 and may transmit the collaborator cell request message to other collaborator cell(s), and each of the cell 10004 and the other collaborator cell(s) may transmit one collaborator cell response message to the cell 10002 in response to the collaborator cell request message. The cell 10002 transmits the handover request message to the cell 10006 and other handover cell(s), and each of the cell 10006 and the other handover cell(s) transmits one handover request ACK message to the cell 10002 in response to the handover request message (not shown). Accordingly, the RRC reconfiguration message may comprise handover configurations of the cell 10006 and the other handover cell(s). In one example, the other collaborator cell(s) and the other handover cell(s) are the same cell(s). In one example, the other collaborator cell(s) and the other handover cell(s) are different cells.

Figure 11:
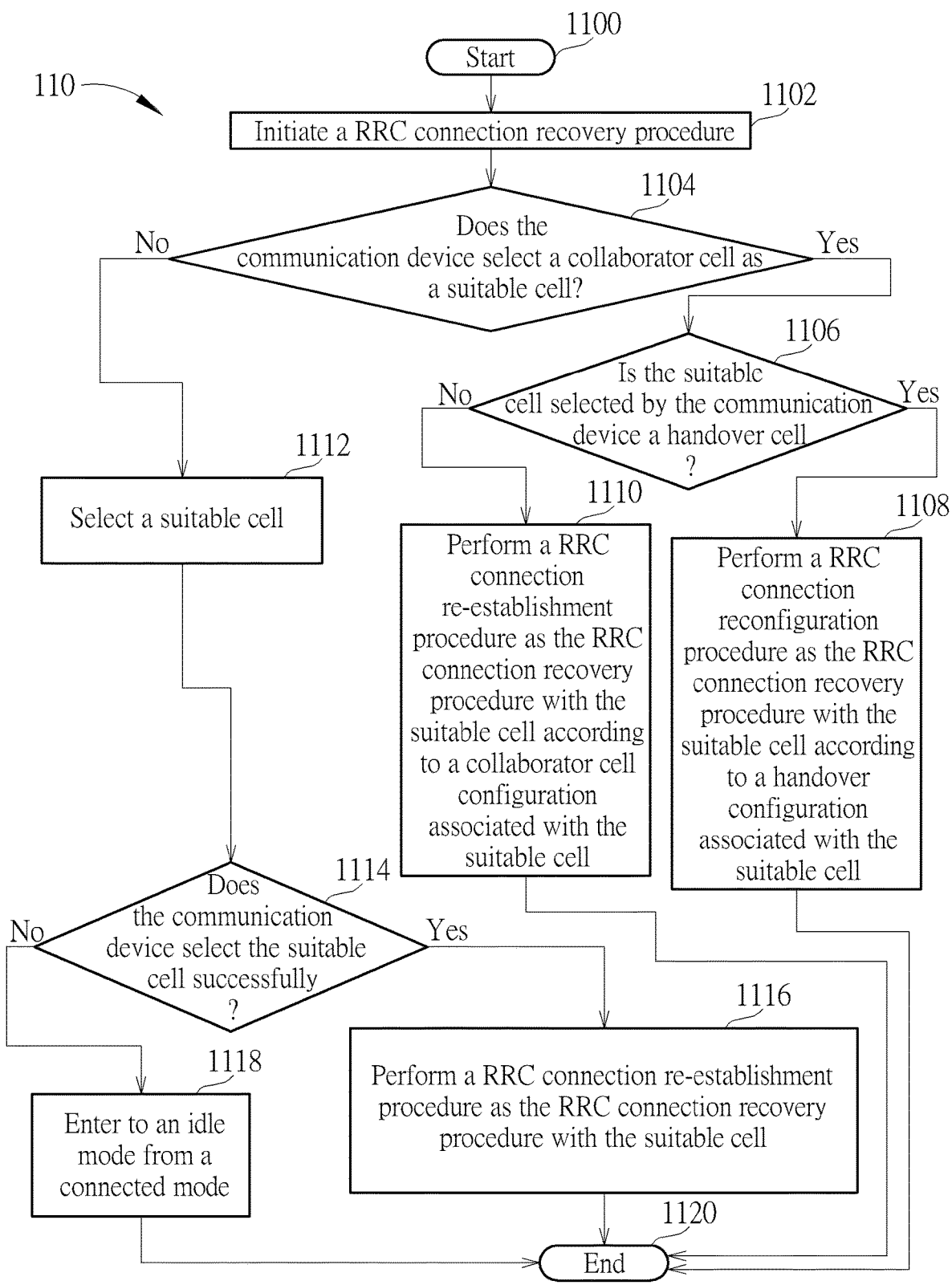
FIG. 11 is a flowchart of a process according to an example of the present invention.

FIG. 11 is a flowchart of a process 110 according to an example of the present invention. The process 110 may be utilized in a communication device (e.g., the communication device 20 in FIG. 2 or the communication device 10000 in FIG. 10). The process 110 includes the following steps:

Step 1100: Start.

Step 1102: Initiate a RRC connection recovery procedure.

Step 1104: Does the communication device select a collaborator cell (e.g., one of the cell 10004 and the other collaborator cell(s) in FIG. 10) as a suitable cell (a cell on which a communication device may camp, e.g., the second cell in the process 30)? If yes, perform Step 1106. If no, perform Step 1112.

Step 1106: Is the suitable cell selected by the communication device a handover cell (e.g., one of the cell 10006 and other handover cell(s) in FIG. 10)? If yes, perform Step 1108. If no, perform Step 1110.

Step 1108: Perform a RRC connection reconfiguration procedure as the RRC connection recovery procedure with the suitable cell according to a handover configuration associated with the suitable cell. After successfully performing Step 1108, the communication device performs Step 1120.

Step 1110: Perform a RRC connection re-establishment procedure as the RRC connection recovery procedure with the suitable cell according to a collaborator cell configuration associated with the suitable cell. After successfully performing Step 1110, the communication device performs Step 1120.

Step 1112: Select a suitable cell.

Step 1114: Does the communication device select the suitable cell successfully? If yes, perform Step 1116. If no, perform Step 1118.

Step 1116: Perform a RRC connection re-establishment procedure as the RRC connection recovery procedure with the suitable cell. After successfully performing Step 1116, the communication device performs Step 1120.

Step 1118: Enter to an idle mode from a connected mode.

Step 1120: End.

In the Step 1102, if the communication device is configured with at least one collaborator cell configuration associated with at least one cell of the NTN and the at least one collaborator cell configuration is considered as valid, and is configured with at least one handover configuration associated with at least one cell of the NTN and the at least one handover configuration is considered as valid. The communication device performs suitable cell evaluation according to the at least one collaborator cell configuration to select a suitable cell (e.g., only perform the suitable cell evaluation among the cells that the identity of the cell, the frequency of the cell, or the frequency of the reference signal(s) of the cell is comprised in one of the at least one collaborator cell configuration).

In the Steps 1104, the communication device determines whether the suitable cell is one of the collaborator cell(s) (e.g., the cell 10004 and the other collaborator cell(s) in FIG. 10) according to whether the suitable cell is associated with one of the at least one collaborator cell configuration.

In the Step 1106, the communication device determines whether the suitable cell is a handover cell.

In the Step 1112, the communication device selects a suitable cell. The selection of the suitable cell may comprise performing at least one evaluation (or performing the at least one evaluation and at least one measurement) according to a cell selection configuration configured by system information of the serving cell of the communication device (i.e., the first cell in the process 30), or according to a stored cell selection configuration configured by the serving cell or by the previous serving cell.

In the Step 1116, The RRC re-establishment procedure may comprise a random access procedure between the communication device and the suitable cell. The information required to access the suitable cell may be obtain from the system information associated with the suitable cell obtained by the communication device (e.g., the communication device may acquire the system information of the suitable cell from the system information broadcast by the suitable cell), or may be configured from previous serving cell and is stored by the communication device.

In the process 110:
(a) if a suitable cell is selected successfully and if the suitable cell is a handover cell, the communication device performs a RRC connection reconfiguration procedure as the RRC connection recovery procedure with the suitable cell according to a handover configuration associated with the suitable cell;
(b) if a suitable cell is selected successfully and if the suitable cell is not a handover cell but a collaborator cell, the communication device performs a RRC connection re-establishment procedure as the RRC connection recovery procedure with the suitable cell according to the collaborator cell configuration associated with the collaborator cell;
(c) if a suitable cell is selected successfully and the suitable cell is neither a handover cell nor a collaborator cell, the communication device performs a RRC connection re-establishment procedure as the RRC connection recovery procedure with the suitable cell according to, for example, the system information associated with the suitable cell, or the stored information that may be configured by the serving cell or by a previous serving cell.

Figure 12:
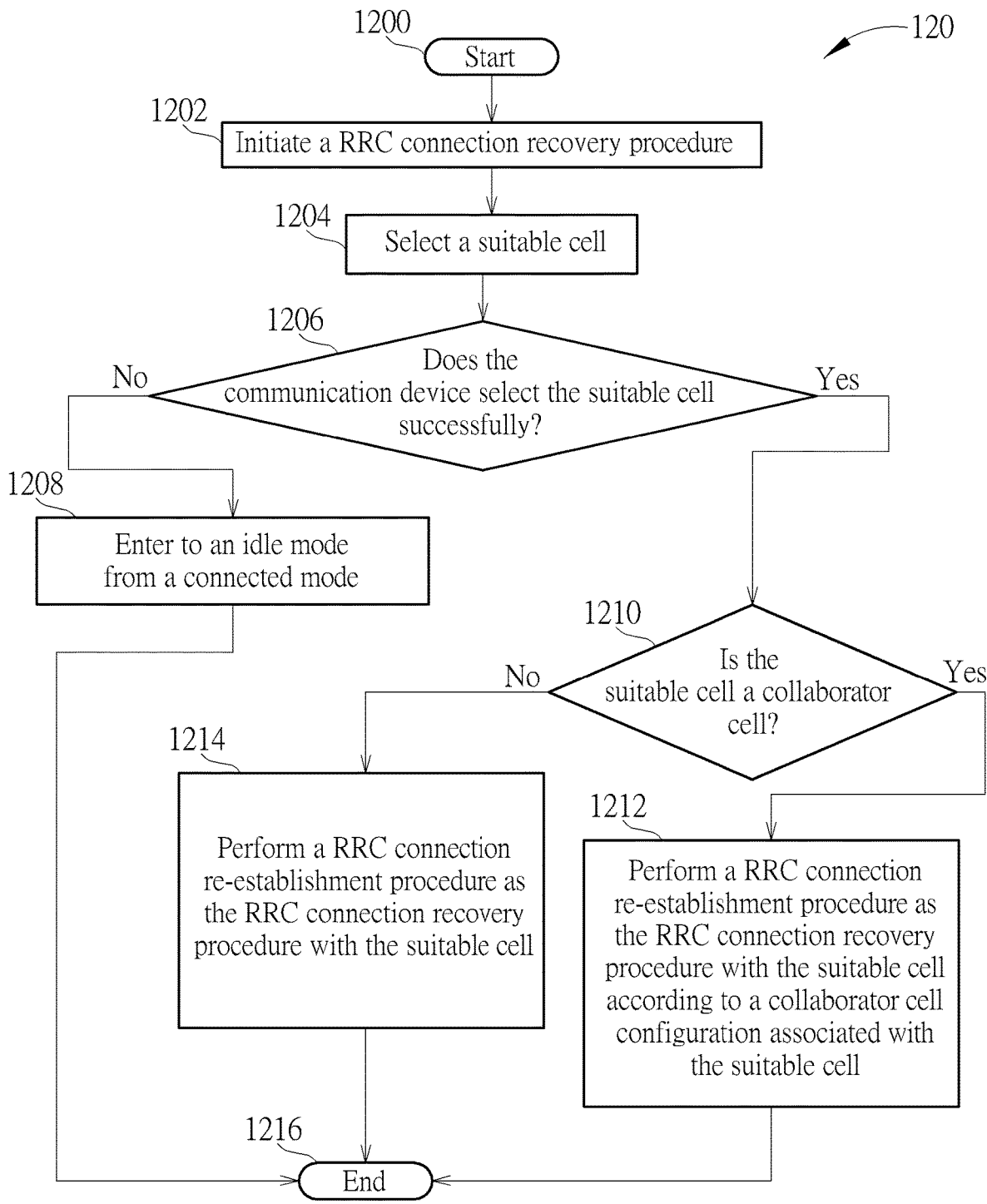
FIG. 12 is a flowchart of a process according to an example of the present invention.

FIG. 12 is a flowchart of a process 120 according to an example of the present invention. The process 120 may be utilized in a communication device (e.g., the communication device 20 in FIG. 2 or the communication device 10000 in FIG. 10). The process 120 includes the following steps:

Step 1200: Start.

Step 1202: Initiate a RRC connection recovery procedure.

Step 1204: Select a suitable cell (a cell on which a communication device may camp, e.g., the second cell in the process 30).

Step 1206: Does the communication device select a suitable cell successfully? If yes, perform Step 1210. If no, perform Step 1208.

Step 1208: Enter to an idle mode from a connected mode, and perform Step 1216.

Step 1210: Is the suitable cell a collaborator cell? If yes, perform Step 1212. If no, perform Step 1214.

Step 1212: Perform a RRC connection re-establishment procedure as the RRC connection recovery procedure with the suitable cell according to a collaborator cell configuration associated with the suitable cell, and perform Step 1216.

Step 1214: Perform a RRC connection re-establishment procedure as the RRC connection recovery procedure with the suitable cell.

Step 1216: End.

In the Step 1204, the communication device selects a suitable cell. The selection of the suitable cell may comprise performing at least one evaluation (or performing the at least one evaluation and at least one measurement) according to a cell selection configuration configured by system information of the serving cell of the communication device (i.e., the first cell in the process 30), or according to a stored cell selection configuration configured by the serving cell or by the previous serving cell of the communication device.

In the Step 1206, the communication device determines whether a suitable cell is selected successfully. In the Step 1210, the communication device determines whether the suitable cell is a collaborator cell.

In the process 120:
(a) if a suitable cell is selected successfully and if the suitable cell is a collaborator cell, the communication device performs a RRC connection re-establishment procedure as the RRC connection recovery procedure with the collaborator cell according to the collaborator cell configuration associated with the collaborator cell;
(b) if a suitable cell is selected successfully and the suitable cell is not a collaborator cell, the communication device performs a RRC connection re-establishment procedure as the RRC connection recovery procedure with the suitable cell according to e.g. the system information associated with the suitable cell, or the stored information that may be configured by the serving cell or by a previous serving cell.

Figure 13:
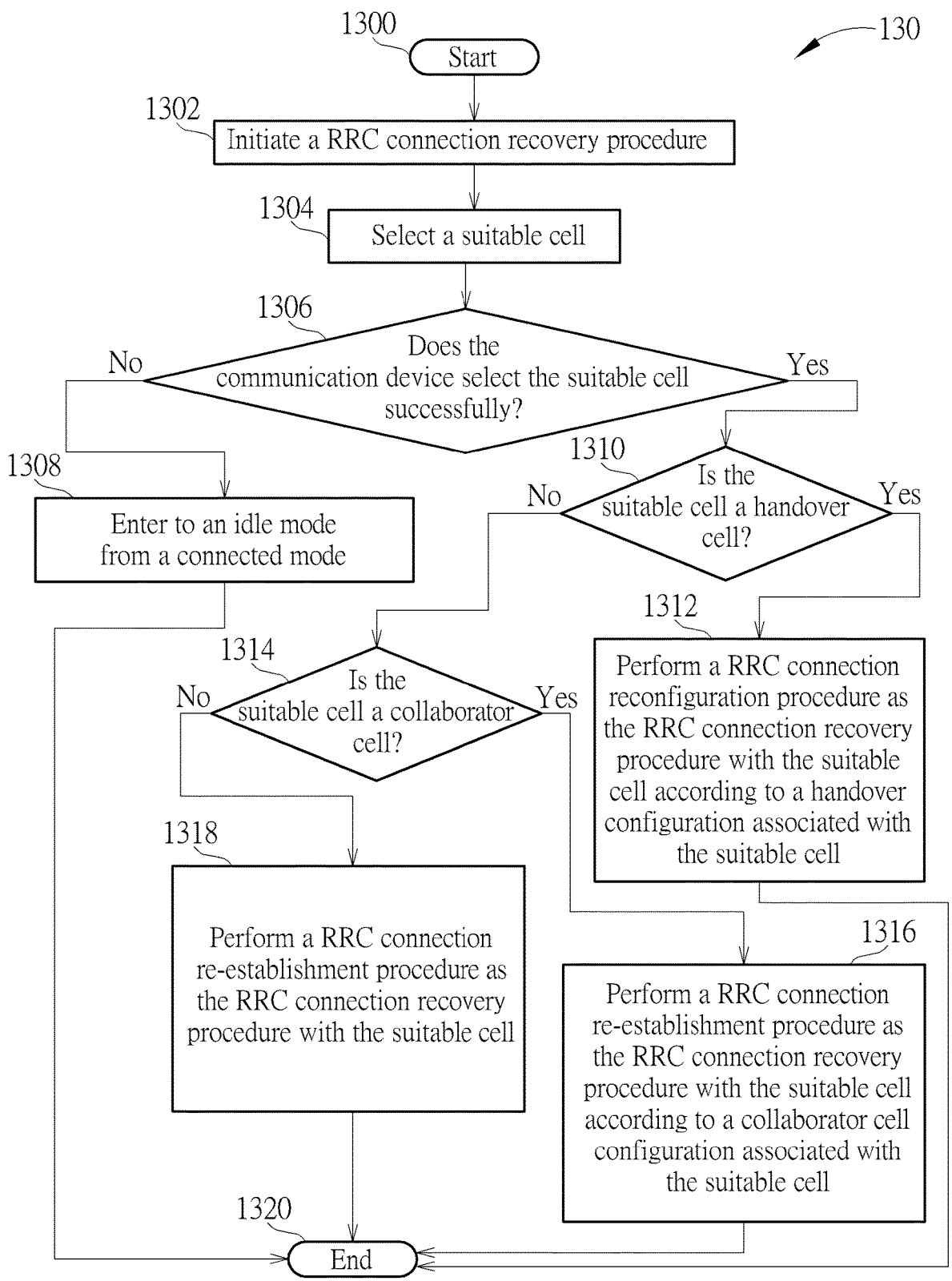
FIG. 13 is a flowchart of a process according to an example of the present invention.

FIG. 13 is a flowchart of a process 130 according to an example of the present invention. The process 130 may be utilized in a communication device (e.g., the communication device 20 in FIG. 2 or the communication device 10000 in FIG. 10). The process 130 includes the following steps:

Step 1300: Start.

Step 1302: Initiate a RRC connection recovery procedure.

Step 1304: Select a suitable cell (a cell on which a communication device may camp, e.g., the second cell in the process 30).

Step 1306: Does the communication device select the suitable cell successfully? If yes, perform Step 1310. If no, perform Step 1308.

Step 1308: Enter to an idle mode from a connected mode, and perform Step 1320.

Step 1310: Is the suitable cell a handover cell? If yes, perform Step 1312. If no, perform Step 1314.

Step 1312: Perform a RRC connection reconfiguration procedure as the RRC connection recovery procedure with the suitable cell according to a handover configuration associated with the suitable cell, and perform Step 1320.

Step 1314: Is the suitable cell a collaborator cell? If yes, perform Step 1316. If no, perform Step 1318.

Step 1316: Perform a RRC connection re-establishment procedure as the RRC connection recovery procedure with the suitable cell according to a collaborator cell configuration associated with the suitable cell, and perform Step 1320.

Step 1318: Perform a RRC connection re-establishment procedure as the RRC connection recovery procedure with the suitable cell.

Step 1320: End.

In the Step 1304, the communication device selects a suitable cell. The selection of the suitable cell may comprise performing at least one evaluation (or performing the at least one evaluation and at least one measurement) according to a cell selection configuration configured by system information of the serving cell of the communication device (i.e., the first cell in the process 30), or according to a stored cell selection configuration configured by the serving cell or by the previous serving cell of the communication device.

In the Step 1306, the communication device determines whether a suitable cell is selected successfully. In the Step 1310, the communication device determines whether the suitable cell is a handover cell. In the Step 1314, the communication device determines whether the suitable cell is a collaborator cell.

In the process 130:
(a) if a suitable cell is selected successfully and if the suitable cell is a handover cell, the communication device performs a RRC connection reconfiguration procedure as the RRC connection recovery procedure with the suitable cell according to a handover configuration associated with the suitable cell;
(b) if a suitable cell is selected successfully and if the suitable cell is not a handover cell but a collaborator cell, the communication device performs a RRC connection re-establishment procedure as the RRC connection recovery procedure with the collaborator cell according to the collaborator cell configuration associated with the collaborator cell;
(c) if a suitable cell is selected successfully and the suitable cell is neither a handover cell nor a collaborator cell, the communication device performs a RRC connection re-establishment procedure as the RRC connection recovery procedure with the suitable cell according to e.g. the system information associated with the suitable cell, or the stored information that may be configured by the serving cell or by a previous serving cell.

Figure 14:
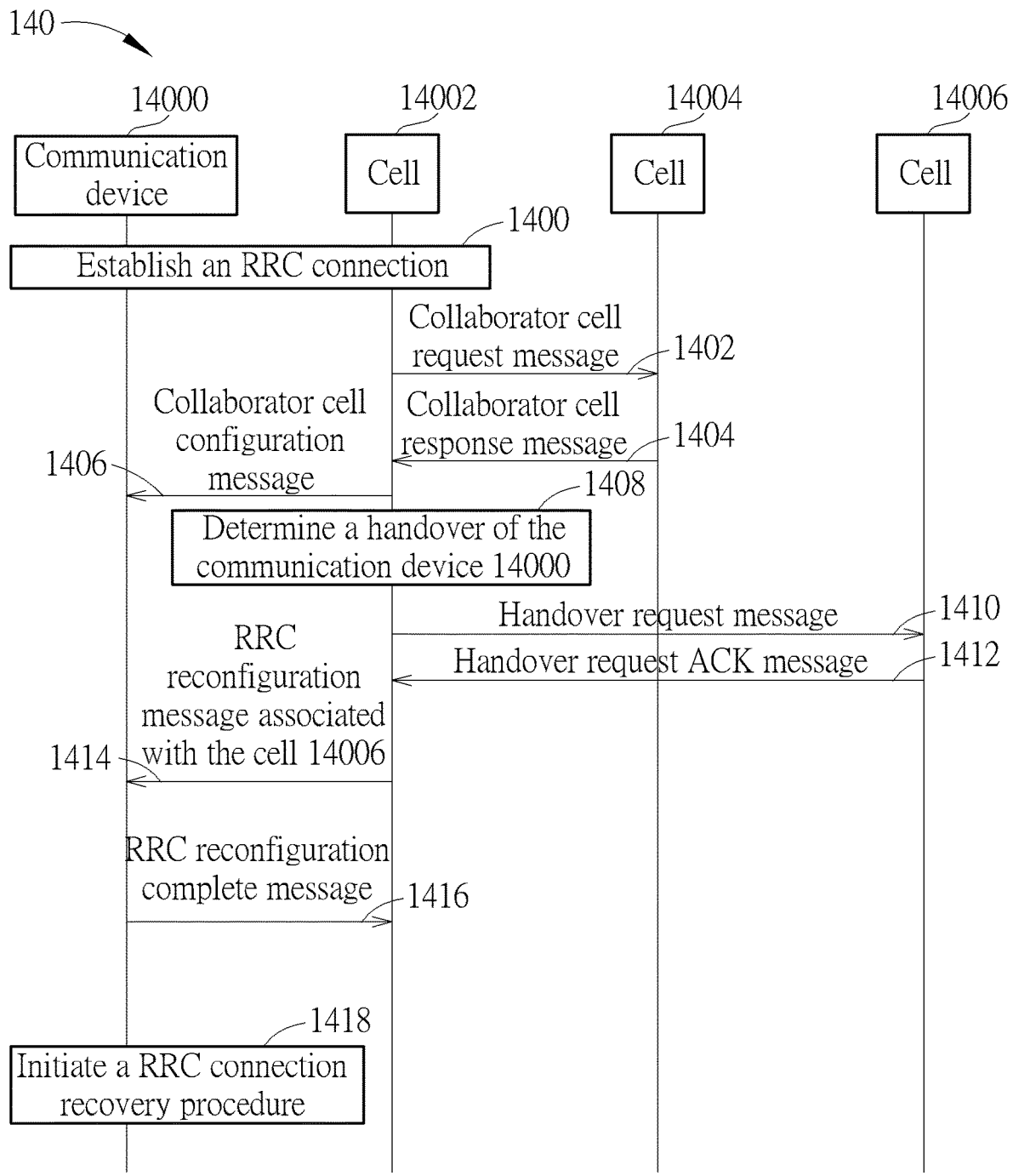
FIG. 14 is a sequence diagram of a process according to an example of the present invention.

FIG. 14 is a sequence diagram of a process 140 according to an example of the present invention. The process 140 is performed by a communication device 14000 (e.g., the communication device 20 in FIG. 2), a cell 14002 (e.g., the first cell in the process 30), a cell 14004 (e.g., the at least one cell of the NTN in the process 30) and a cell 14006 (e.g., the at least one cell of the NTN in the process 30). The cell 14002 is a NTN serving cell of the communication device 14000. The Steps 1400-1406 can be referred to the Steps 1000-1006 in FIG. 10, and are not narrated herein for brevity. The cell 14002 determines a handover (e.g., a conditional handover) of the communication device 14000 (Step 1408), and transmits a handover request message to the cell 14006 (Step 1410), to negotiate with the cell 14006. Then, the cell 14002 receives a handover request ACK message from the cell 10006 (Step 1412), and transmits a RRC reconfiguration message associated with the cell 14006 to the communication device 14000 (Step 1414). The communication device 14000 performs a handover procedure according to the RRC reconfiguration message associated with the cell 14006. If the communication device 14000 determines as failed to complete the handover procedure to handover from cell 14002 to cell 14006 (e.g., the communication device 14000 failed to detect the cell 14006, fails to perform a random access procedure with the cell 14006, or fails to transits a RRC reconfiguration complete message to the cell 14006 (Step 1416)), the communication device 14000 initiates a RRC connection recovery procedure (Step 1418).

In one example, the cell 14002 comprises a SRB0 and a SRB1. In one example, the cell 14002 further comprises at least one of at least one other SRB or at least one DRB. In one example, the cell 14002 determines collaborator cell(s) (e.g., the cell 14004) for the communication device 14000 according to, for example, a network deployment, a network policy, or UE information or measurement report(s) received from the communication device 14000, to perform the RRC connection recovery procedure. In one example, the cell 14002 generates the collaborator cell configuration message comprising a collaborator cell configuration of the cell 14004 according to the collaborator cell response message.

In one example, the cell 14002 modifies the collaborator cell configuration of the cell 14004 (e.g., adds, changes, removes a part of or all content of the collaborator cell configuration) by transmitting another collaborator cell configuration message to the communication device 14000. In one example, the cell 14002 determines the handover (e.g., the conditional handover) of the communication device 14000 and determines handover cell(s) (e.g., the cell 14006) for the communication device 14000 according to measurement report(s) received from the communication device 14000, the orbital information associated with the first cell and/or the cell 14006, or the service time and/or area information associated with the first cell and/or the cell 14006. In one example, the RRC reconfiguration message comprises a handover configuration with a "ReconfigurationWithSync". In one example, the RRC reconfiguration message may further comprise a handover configuration with an execution condition of the cell 14006.

In one example, the communication device 14000 initiates a RRC connection recovery procedure, before the execution condition of the cell 14006 is satisfied. In one example, the communication device 14000 initiates a RRC connection recovery procedure, after failing to perform the handover from the cell 14002 to the cell 14006.

In FIG. 14, the cell 14002 transmits the collaborator cell request message to the cell 14004 (or to the cell 14006 and other collaborator cell(s)), and each of the cell 14004 and the other collaborator cell(s) transmits one collaborator cell response message to the cell 14002 in response to the collaborator cell request message (not shown). The cell 14002 transmits the handover request message to the cell 14006 (or to the cell 14006 and other handover cell(s)), and each of the cell 14006 and the other handover cell(s) transmits one handover request ACK message to the cell 14002 in response to the handover request message (not shown). The RRC reconfiguration message may comprise handover configurations with execution conditions of the cell 14006 and other handover cell(s). In one example, the other collaborator cell(s) and the other handover cell(s) are the same cell(s). In one example, the other collaborator cell(s) and the other handover cell(s) are different cells.

Figure 15:
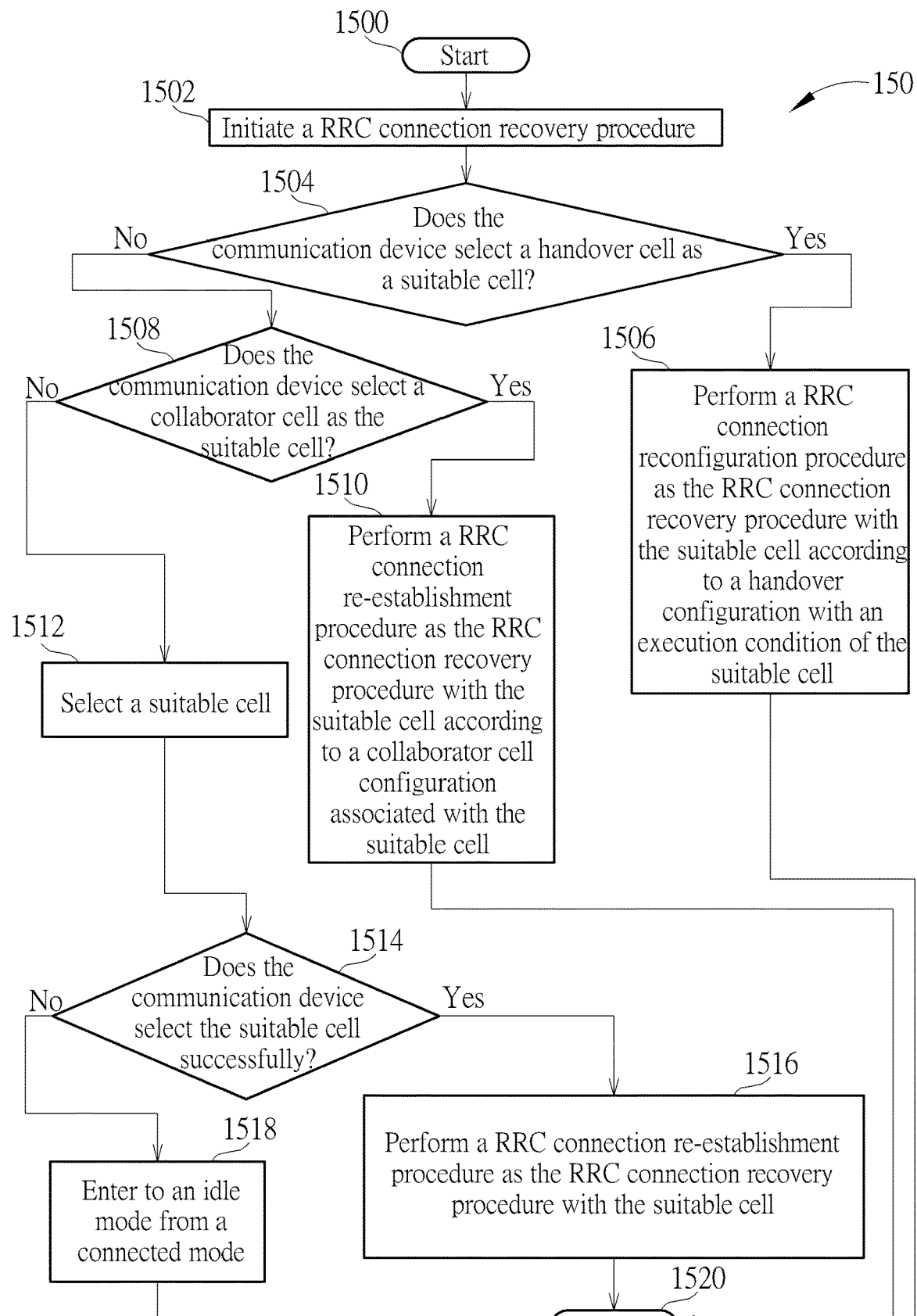
FIG. 15 is a flowchart of a process according to an example of the present invention.

FIG. 15 is a flowchart of a process 150 according to an example of the present invention. The process 150 may be utilized in a communication device (e.g., the communication device 20 in FIG. 2 or the communication device 14000 in FIG. 14). The process 150 includes the following steps:

Step 1500: Start.

Step 1502: Initiate a RRC connection recovery procedure.

Step 1504: Does the communication device select a handover cell as a suitable cell (a cell on which a communication device may camp, e.g., the second cell in the process 30)? If yes, perform Step 1506. If no, perform Step 1508.

Step 1506: Perform a RRC connection reconfiguration procedure as the RRC connection recovery procedure with the suitable cell according to a handover configuration with an execution condition of the suitable cell. After successfully performing Step 1506, the communication device performs Step 1520.

Step 1508: Does the communication device select a collaborator cell as the suitable cell? If yes, perform Step 1510. If no, perform Step 1512.

Step 1510: Perform a RRC connection re-establishment procedure as the RRC connection recovery procedure with the suitable cell according to a collaborator cell configuration associated with the suitable cell. After successfully performing Step 1510, the communication device performs Step 1520.

Step 1512: Select a suitable cell.

Step 1514: Does the communication device select the suitable cell successfully? If yes, perform Step 1516. If no, perform Step 1518.

Step 1516: Perform a RRC connection re-establishment procedure as the RRC connection recovery procedure with the suitable cell. After successfully performing Step 1506, the communication device performs Step 1520.

Step 1518: Enter to an idle mode from a connected mode.

Step 1520: End.

In the Step 1502, if the communication device 1500 is configured with at least one collaborator cell configuration associated with at least one cell of the NTN and the at least one collaborator cell configuration is considered as valid, and is configured with at least one handover configuration associated with at least one cell of the NTN and the at least one handover configuration is considered as valid. The communication device performs suitable cell evaluation and may perform at least one measurement according to the at least one collaborator cell configuration to select a suitable cell (e.g., only perform suitable cell evaluation among the cells that the identity of the cell, the frequency of the cell, or the frequency of the reference signal(s) of the cell is comprised in one of the at least one collaborator cell configuration).

In the Step 1504, the communication device determines whether the suitable cell is a handover cell. In the Step 1508, the communication device determines whether the suitable cell is a collaborator cell.

In the process 150:
(a) if a suitable cell is selected successfully and if the suitable cell is a handover cell, the communication device performs a RRC connection reconfiguration procedure as the RRC connection recovery procedure with the suitable cell according to a handover configuration associated with the suitable cell;
(b) if a suitable cell is selected successfully and if the suitable cell is not a handover cell but a collaborator cell, the communication device performs a RRC connection re-establishment procedure as the RRC connection recovery procedure with the suitable cell according to the collaborator cell configuration associated with the suitable cell;
(c) if a suitable cell is selected successfully and the suitable cell is neither a handover cell nor a collaborator cell, the communication device performs a RRC connection re-establishment procedure as the RRC connection recovery procedure with the suitable cell according to e.g. the system information associated with the suitable cell, or the stored information that may be configured by the serving cell or by a previous serving cell.

Figure 16:
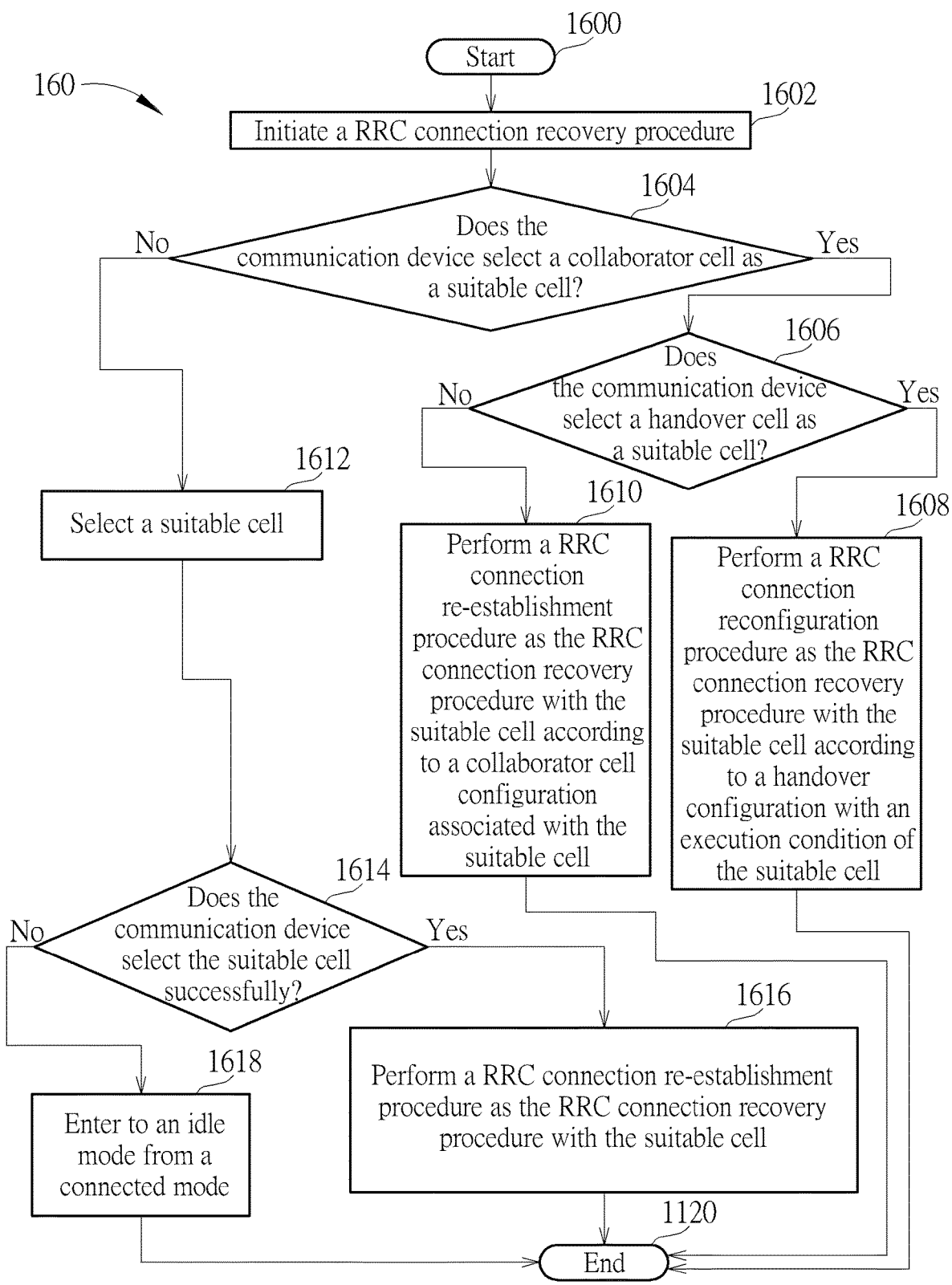
FIG. 16 is a flowchart of a process according to an example of the present invention.

FIG. 16 is a flowchart of a process 160 according to an example of the present invention. The process 160 may be utilized in a communication device (e.g., the communication device 20 in FIG. 2 or the communication device 14000 in FIG. 14). The process 160 includes the following steps:

Step 1600: Start.

Step 1602: Initiate a RRC connection recovery procedure.

Step 1604: Does the communication device select a collaborator cell as a suitable cell (a cell on which a communication device may camp, e.g., the second cell in the process 30)? If yes, perform Step 1606. If no, perform Step 1612.

Step 1606: Does the communication device select a handover cell as a suitable cell? If yes, perform Step 1608. If no, perform Step 1610.

Step 1608: Perform a RRC connection reconfiguration procedure as the RRC connection recovery procedure with the suitable cell according to a handover configuration with an execution condition of the suitable cell. After successfully performing Step 1608, the communication device performs Step 1620.

Step 1610: Perform a RRC connection re-establishment procedure as the RRC connection recovery procedure with the suitable cell according to a collaborator cell configuration associated with the suitable cell. After successfully performing Step 1610, the communication device performs Step 1620.

Step 1612: Select a suitable cell.

Step 1614: Does the communication device select the suitable cell successfully? If yes, perform Step 1616. If no, perform Step 1618.

Step 1616: Perform a RRC connection re-establishment procedure as the RRC connection recovery procedure with the suitable cell. After successfully performing Step 1616, the communication device performs Step 1620.

Step 1618: Enter to an idle mode from a connected mode.
Step 1620: End.

In the Step 1602, if the communication device 1600 is configured with at least one collaborator cell configuration associated with at least one cell of the NTN and the at least one collaborator cell configuration is considered as valid, and is configured with at least one handover configuration associated with at least one cell of the NTN and the at least one handover configuration is considered as valid. The communication device performs suitable cell evaluation and may perform at least one measurement according to the at least one collaborator cell configuration to select a suitable cell (e.g., only perform suitable cell evaluation among the cells that the identity of the cell, the frequency of the cell, or the frequency of the reference signal(s) of the cell is comprised in one of the at least one collaborator cell configuration).

In the Step 1604, the communication device determines whether the suitable cell is a collaborator cell. In the Step 1606, the communication device determines whether the suitable cell is a handover cell.

In the process 160:
(a) if a suitable cell is selected successfully and if the suitable cell is a collaborator cell, the communication device performs a RRC connection re-establishment procedure as the RRC connection recovery procedure with the suitable cell according to the collaborator cell configuration associated with the suitable cell;
(b) if a suitable cell is selected successfully and if the suitable cell is not a collaborator cell but a handover cell, the communication device performs a RRC connection reconfiguration procedure as the RRC connection recovery procedure with the suitable cell according to a handover configuration associated with the suitable cell;
(c) if a suitable cell is selected successfully and the suitable cell is neither a collaborator cell nor a handover cell, the communication device performs a RRC connection re-establishment procedure as the RRC connection recovery procedure with the suitable cell according to e.g. the system information associated with the suitable cell, or the stored information that may be configured by the serving cell or by a previous serving cell.

Figure 17:
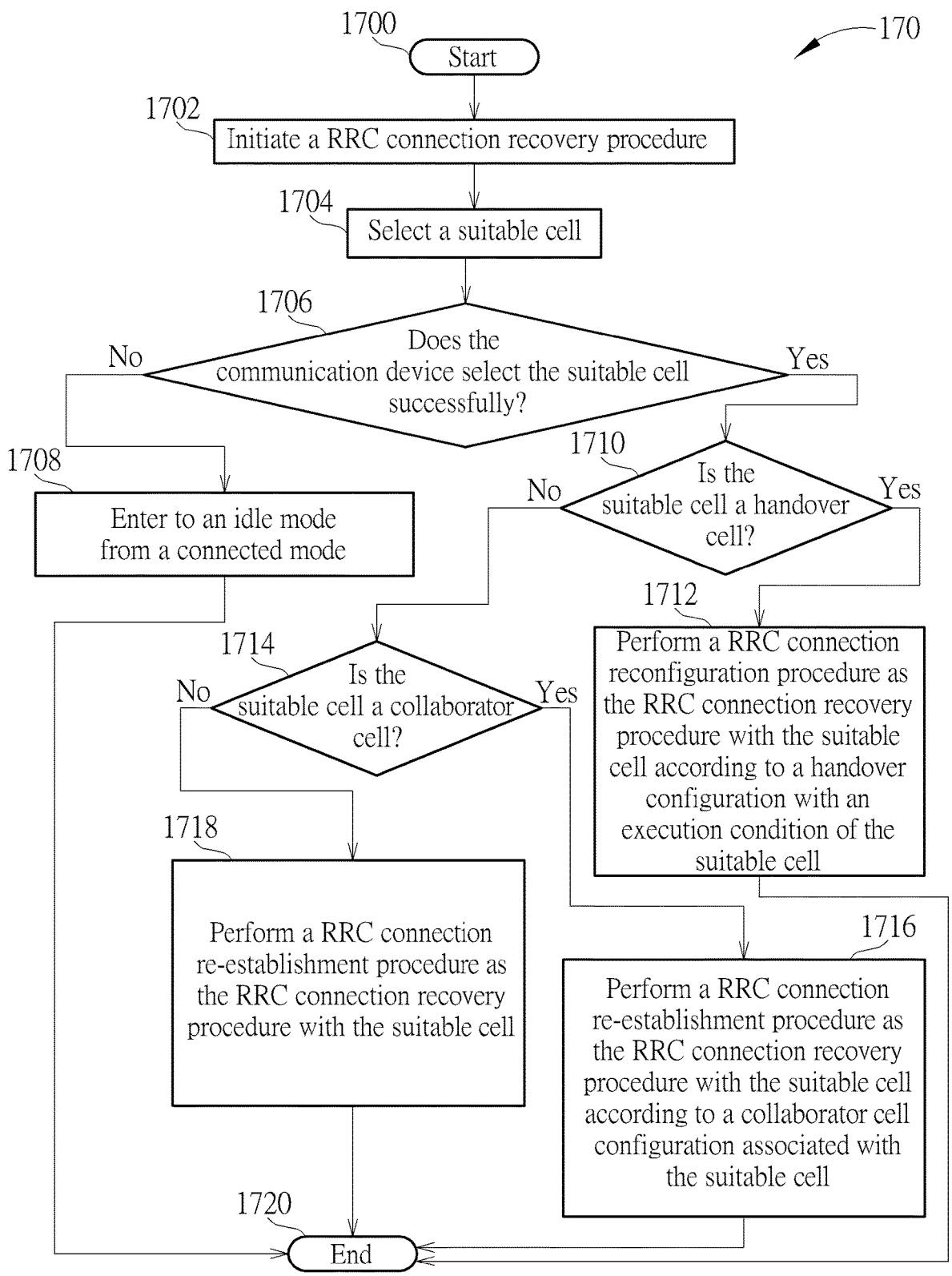
FIG. 17 is a flowchart of a process according to an example of the present invention.

FIG. 17 is a flowchart of a process 170 according to an example of the present invention. The process 170 may be utilized in a communication device (e.g., the communication device 20 in FIG. 2 or the communication device 14000 in FIG. 14). The process 170 includes the following steps:

Step 1700: Start.
Step 1702: Initiate a RRC connection recovery procedure.
Step 1704: Select a suitable cell (a cell on which a communication device may camp, e.g., the second cell in the process 30).
Step 1706: Does the communication device select the suitable cell successfully? If yes, perform Step 1710. If no, perform Step 1708.
Step 1708: Enter to an idle mode from a connected mode.
Step 1710: Is the suitable cell a handover cell (e.g., one of the cells 14006 and the other handover cell(s) in FIG. 14)? If yes, perform Step 1712. If no, perform Step 1714.
Step 1712: Perform a RRC connection reconfiguration procedure as the RRC connection recovery procedure with the suitable cell according to a handover configuration with an execution condition of the suitable cell. After successfully performing Step 1712, the communication device performs Step 1720.
Step 1714: Is the suitable cell a collaborator cell (e.g., one of the cells 14004 and the other collaborator cell(s) in FIG. 14)? If yes, perform Step 1716. If no, perform Step 1718.
Step 1716: Perform a RRC connection re-establishment procedure as the RRC connection recovery procedure with the suitable cell according to a collaborator cell configuration associated with the suitable cell. After successfully performing Step 1716, the communication device performs Step 1720.
Step 1718: Perform a RRC connection re-establishment procedure as the RRC connection recovery procedure with the suitable cell.
Step 1720: End.

In the Step 1704, the communication device selects a suitable cell. The selection of the suitable cell may comprise performing at least one evaluation (or performing the at least one evaluation and at least one measurement) according to a cell selection configuration configured by system information of the serving cell of the communication device (i.e., the first cell in the process 30), or according to a stored cell selection configuration configured by the serving cell or by the previous serving cell of the communication device.

In the process 170:
(a) if a suitable cell is selected successfully and if the suitable cell is a handover cell, the communication device performs a RRC connection reconfiguration procedure as the RRC connection recovery procedure with the suitable cell according to a handover configuration associated with the suitable cell;
(b) if a suitable cell is selected successfully and if the suitable cell is not a handover cell but a collaborator cell, the communication device performs a RRC connection re-establishment procedure as the RRC connection recovery procedure with the suitable cell according to the collaborator cell configuration associated with the suitable cell;
(c) if a suitable cell is selected successfully and the suitable cell is neither a collaborator cell nor a handover cell, the communication device performs a RRC connection re-establishment procedure as the RRC connection recovery procedure with the suitable cell according to e.g. the system information associated with the suitable cell, or the stored information that may be configured by the serving cell or by a previous serving cell.

Figure 18:
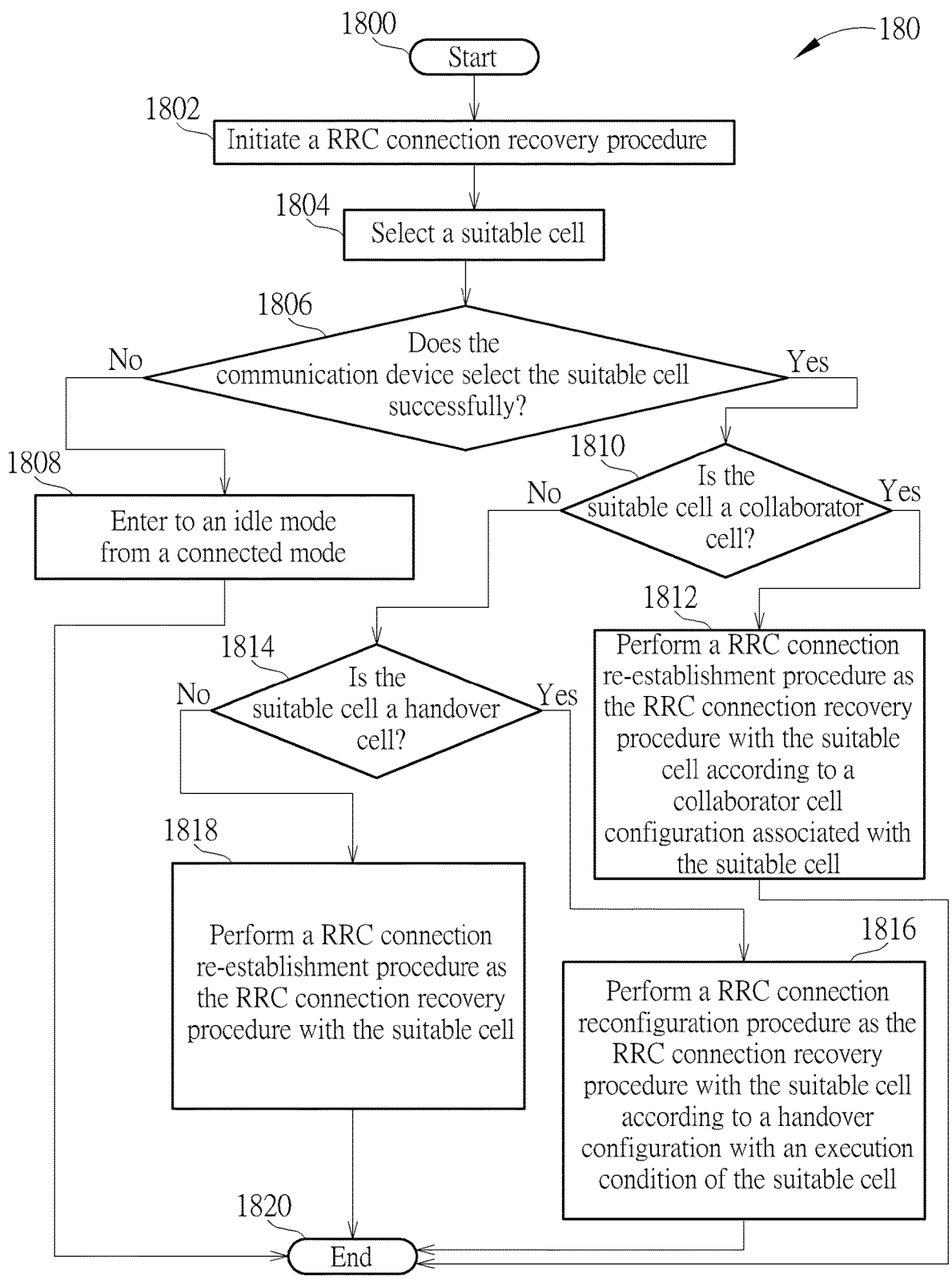
FIG. 18 is a flowchart of a process according to an example of the present invention.

FIG. 18 is a flowchart of a process 180 according to an example of the present invention. The process 180 may be utilized in a communication device (e.g., the communication device 20 in FIG. 2 or the communication device 14000 in FIG. 14). The process 180 includes the following steps:

Step 1800: Start.
Step 1802: Initiate a RRC connection recovery procedure.
Step 1804: Select a suitable cell (a cell on which a communication device may camp, e.g., the second cell in the process 30).
Step 1806: Does the communication device select the suitable cell successfully? If yes, perform Step 1810. If no, perform Step 1808.
Step 1808: Enter to an idle mode from a connected mode.
Step 1810: Is the suitable cell a collaborator cell? If yes, perform Step 1812. If no, perform Step 1814.
Step 1812: Perform a RRC connection re-establishment procedure as the RRC connection recovery procedure with the suitable cell according to a collaborator cell configuration associated with the suitable cell. After successfully performing Step 1812, the communication device performs Step 1820.

Step 1814: Is the suitable cell a handover cell? If yes, perform Step 1816. If no, perform Step 1818.

Step 1816: Perform a RRC connection reconfiguration procedure as the RRC connection recovery procedure with the suitable cell according to a handover configuration with an execution condition of the suitable cell. After successfully performing Step 1816, the communication device performs Step 1720.

Step 1818: Perform a RRC connection re-establishment procedure as the RRC connection recovery procedure with the suitable cell.

Step 1820: End.

In the Step 1804, the communication device selects a suitable cell. The selection of the suitable cell may comprise performing at least one evaluation and may perform at least one measurement according to a cell selection configuration configured by system information of the serving cell of the communication device (i.e., the first cell in the process 30), or according to a stored cell selection configuration configured by the serving cell or by the previous serving cell of the communication device.

In the process 180:
(a) if a suitable cell is selected successfully and if the suitable cell is not a collaborator cell, the communication device performs a RRC connection re-establishment procedure as the RRC connection recovery procedure with the suitable cell according to the collaborator cell configuration associated with the suitable cell;
(b) if a suitable cell is selected successfully and if the suitable cell is not a collaborator cell but a handover cell, the communication device performs a RRC connection reconfiguration procedure as the RRC connection recovery procedure with the suitable cell according to a handover configuration associated with the suitable cell;
(c) if a suitable cell is selected successfully and the suitable cell is neither a collaborator cell nor a handover cell, the communication device performs a RRC connection re-establishment procedure as the RRC connection recovery procedure with the suitable cell according to e.g. the system information associated with the suitable cell, or the stored information that may be configured by the serving cell or by a previous serving cell.

The operation of "determine" described above may be replaced by the operation of "compute", "calculate", "obtain", "generate", "output, "use", "choose/select", "decide" or "is configured to". The operation of "detect" described above may be replaced by the operation of "monitor", "receive", "sense" or "obtain". The phrase of "according to" described above may be replaced by "in response to". The phrase of "associated with" described above may be replaced by "of" or "corresponding to". The term of "via" described above may be replaced by "on", "in" or "at". The term of "when" described above may be replaced by "upon" and "after".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module (s), the hardware and/or the electronic system to perform the related steps.

Examples of the electronic system may include a system on chip (SoC), system in package (SiP), a computer on module (COM), a computer program product, an apparatus, a mobile phone, a laptop, a tablet computer, an electronic book or a portable computer system, and the communication device 20.

To sum up, embodiments of the present invention provide a communication device and method for handling a recovery of a RRC connection of a NTN. The initiation of the RRC connection recovery procedure is regarded as a trigger event to recovery the RRC connection of the NTN. In addition, the communication device performs the RRC connection recovery procedure according to a collaborator cell configuration associated with a target cell (e.g., the second cell in the process 30), a handover cell configuration associated with the target cell or system information associated with the target cell. In different conditions/environments, the RRC connection recovery procedure is performed in different ways. Thus, the performance of recovering the RRC connection of the NTN can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a recovery of a radio resource control (RRC) connection of a non-terrestrial network (NTN), comprising:
at least one storage device; and
at least one processing circuit, coupled to the at least one storage device,
wherein the at least one storage device stores instructions, and the at least one processing circuit is configured to execute the instructions of:
establishing an RRC connection with a first cell of the NTN;
receiving a collaborator cell configuration message from the first cell, wherein the collaborator cell configuration message comprises at least one collaborator cell configuration associated with at least one cell of the NTN;

initiating a RRC connection recovery procedure, after receiving the collaborator cell configuration message;

selecting a second cell for the RRC connection recovery procedure, when the communication device initiates the RRC connection recovery procedure; and performing a RRC connection re-establishment procedure with the second cell according to system information associated with the second cell, when the second cell is not associated with the at least one collaborator cell configuration associated with the at least one cell of the NTN and the communication device is not configured with a valid handover configuration associated with the second cell.

2. The communication device of claim 1, wherein the instruction of performing the RRC connection recovery procedure comprises:

performing a RRC connection re-establishment procedure as the RRC connection recovery procedure.

3. The communication device of claim 2, wherein the instruction of performing the RRC connection re-establishment procedure as the RRC connection recovery procedure comprises:

performing the RRC connection re-establishment procedure with the second cell according to a collaborator cell configuration associated with the second cell, when the communication device is configured with the collaborator cell configuration of the at least one collaborator cell configuration;

wherein the collaborator cell configuration associated with the second cell is a collaborator cell configuration of the at least one collaborator cell configuration comprised in the collaborator cell configuration message.

4. The communication device of claim 1, wherein the instruction of performing the RRC connection recovery procedure comprises:

performing a RRC connection reconfiguration procedure as the RRC connection recovery procedure.

5. The communication device of claim 4, wherein the instruction of performing the RRC connection reconfiguration procedure as the RRC connection recovery procedure comprises:

performing the RRC connection reconfiguration procedure with the second cell according to a handover configuration associated with the second cell, when the communication device is configured with a handover configuration of at least one handover configuration.

6. The communication device of claim 5, wherein the handover configuration comprises a "ReconfigurationWithSync" associated with a NTN cell.

7. The communication device of claim 5, wherein the at least one handover configuration comprises at least one execution condition associated with the at least one cell of the NTN, respectively.

8. The communication device of claim 1, wherein the instruction of performing the RRC connection recovery procedure comprises:

performing a random access procedure with the second cell.

9. The communication device of claim 8, wherein the instruction of performing the random access procedure comprises:

transmitting a RRC connection recovery request message to the second cell.

10. The communication device of claim 9, wherein the RRC connection recovery request message comprises at least one of an identity of the communication device to be applied in the second cell, an identity of the first cell, or an identity to be utilized by the second cell to perform authentication of the communication device.

11. The communication device of claim 1, wherein the communication device enters to an idle mode from a connected mode, when failing to select the second cell.

12. The communication device of claim 1, wherein the collaborator cell configuration message comprises a validity time associated with the at least one collaborator cell configuration associated with the at least one cell of the NTN.

13. The communication device of claim 1, wherein a collaborator cell configuration of the at least one collaborator cell configuration comprises a validity period that the collaborator cell configuration is considered as valid in the validity period or a validity area that the collaborator cell configuration is considered as valid in the validity area.

14. The communication device of claim 1, wherein a collaborator cell configuration of the at least one collaborator cell configuration comprises at least one of a cell identity associated with a cell of the at least one cell of the NTN, at least one frequency associated with the cell, at least one frequency associated with at least one reference signal of the cell, or the information to access the cell.

15. The communication device of claim 14, wherein the information to access the cell comprises at least one configuration of random access resource associated with the cell for the communication device to perform a random access procedure with the cell.

16. The communication device of claim 14, wherein the at least one collaborator cell configuration comprises at least one of at least one synchronization signal block (SSB)-based radio resource management (RRM) measurement timing configuration (SMTC) associated with a frequency associated with the cell, an identity of the communication device to be applied in the cell, or an identity to be utilized by the cell to perform authentication for the communication device.

17. The communication device of claim 1, wherein the communication device selects the second cell by performing at least one evaluation according to a cell selection configuration configured by system information of the first cell.

18. The communication device of claim 1, wherein the communication device selects the second cell by performing at least one evaluation according to the at least one collaborator cell configuration associated with the at least one cell of the NTN comprised in the collaborator cell configuration message.

19. The communication device of claim 1, wherein the communication device selects the second cell by performing at least one evaluation according to a handover configuration of at least one handover configuration.

20. The communication device of claim 1, wherein the step of selecting the second cell for the RRC connection recovery procedure comprises:

performing at least one evaluation according to the at least one collaborator cell configuration associated with the at least one cell of the NTN, when the communication device is configured with at least one collaborator cell configuration associated with the at least one cell of the NTN and the communication device is configured with a handover configuration of at least one handover configuration.

21. The communication device of claim 1, wherein the step of selecting a second cell for the RRC connection recovery procedure comprises:

performing at least one evaluation according to a handover configuration of at least one handover configuration, when the communication device is configured with the at least one collaborator cell configuration associated with the at least one cell of the NTN, the communication device is configured with the handover configuration of the at least one handover configuration and the handover configuration is considered as valid.

* * * * *